(12) United States Patent
Parab et al.

(10) Patent No.: US 12,267,257 B2
(45) Date of Patent: Apr. 1, 2025

(54) VIRTUAL MACHINE MIGRATION IN CLOUD INFRASTRUCTURE NETWORKS

(71) Applicant: Nutanix, Inc., San Jose, CA (US)

(72) Inventors: Nitin Parab, Palo Alto, CA (US); Aaron Dean Brown, Sunnyvale, CA (US); Anupama Ashok Lolage, Santa Clara, CA (US); Binny Sher Gill, San Jose, CA (US); Blinston Savio Fernandes, Chinchinim (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/778,754

(22) Filed: Jan. 31, 2020

(65) Prior Publication Data

US 2021/0067466 A1  Mar. 4, 2021

Related U.S. Application Data

(60) Provisional application No. 62/939,569, filed on Nov. 22, 2019, provisional application No. 62/939,567, (Continued)

(51) Int. Cl.
*H04L 49/00*  (2022.01)
*G06F 9/455*  (2018.01)
(Continued)

(52) U.S. Cl.
CPC ...... *H04L 49/3009* (2013.01); *G06F 9/45558* (2013.01); *H04L 61/103* (2013.01);
(Continued)

(58) Field of Classification Search
CPC .................................................. H04L 49/3009
(Continued)

(56) References Cited

U.S. PATENT DOCUMENTS 6,590,861 B1 * 7/2003 Vepa .................. H04L 69/40
370/230
8,549,518 B1   10/2013 Aron et al.
(Continued)

FOREIGN PATENT DOCUMENTS

| CN | 102307246 B | 12/2015 |
|---|---|---|
| CN | 109067931 A | 12/2018 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Suraj M Joshi
*Assistant Examiner* — Sherman Lin
(74) *Attorney, Agent, or Firm* — Vista IP Law Group, LLP

(57) ABSTRACT

Methods, systems and computer program products for deploying a virtualization system onto cloud computing infrastructure. Virtual machines of a virtualization system are deployed onto computing nodes that are interconnected via a cloud provider's networking infrastructure. When migrating a virtual machine from a source computing node to a target computing node that is also interconnected to the cloud provider's networking infrastructure, the addressing of the to-be-migrated virtual machine changes. Dynamically-updated media access control translation tables are maintained at the computing nodes. The media access control translation tables are populated with cloud provider media access control addresses received from the cloud provider. A virtual switch at each computing node modifies incoming and outgoing packets of a to-be-migrated virtual machine based on contents of that node's media access control translation table. On an ongoing basis, addressing information for migrated virtual machines is received at the
(Continued)

computing nodes by operation of address resolution protocols.

24 Claims, 19 Drawing Sheets

Related U.S. Application Data filed on Nov. 22, 2019, provisional application No. 62/894,734, filed on Aug. 31, 2019, provisional application No. 62/894,675, filed on Aug. 30, 2019.

(51) Int. Cl.

| | |
|---|---|
| *H04L 61/103* | (2022.01) |
| *H04L 61/255* | (2022.01) |
| *H04L 61/2592* | (2022.01) |
| *H04L 61/2596* | (2022.01) |
| *H04L 61/50* | (2022.01) |
| *H04L 61/5007* | (2022.01) |
| *H04L 61/5061* | (2022.01) |
| *H04L 67/10* | (2022.01) |
| *H04L 12/46* | (2006.01) |
| *H04L 101/622* | (2022.01) |

(52) U.S. Cl.
CPC ........ *H04L 61/255* (2013.01); *H04L 61/2592* (2013.01); *H04L 61/2596* (2013.01); *H04L 61/50* (2022.05); *H04L 61/5007* (2022.05); *H04L 61/5061* (2022.05); *H04L 67/10* (2013.01); *G06F 2009/4557* (2013.01); *G06F 2009/45595* (2013.01); *H04L 12/4633* (2013.01); *H04L 12/4641* (2013.01); *H04L 2101/622* (2022.05)

(58) Field of Classification Search
USPC ...................................................... 709/226
See application file for complete search history.

(56) References Cited

U.S. PATENT DOCUMENTS

| | | | |
|---|---|---|---|
| 8,601,473 B1 | 12/2013 | Aron et al. | |
| 8,850,130 B1 | 9/2014 | Aron et al. | |
| 9,081,603 B2 | 7/2015 | Zhang et al. | |
| 9,110,703 B2 | 8/2015 | Santos et al. | |
| 9,515,930 B2 | 12/2016 | Devireddy et al. | |
| 9,634,948 B2 | 4/2017 | Brown et al. | |
| 9,692,696 B2 | 6/2017 | Decusatis et al. | |
| 9,772,866 B1 | 9/2017 | Aron et al. | |
| 9,825,905 B2 | 11/2017 | Thakkar et al. | |
| 10,333,827 B2 | 6/2019 | Xu et al. | |
| 2010/0146160 A1* | 6/2010 | Piekarski | G06F 13/105 710/28 |
| 2012/0079143 A1* | 3/2012 | Krishnamurthi | G06F 3/061 710/39 |
| 2013/0308641 A1 | 11/2013 | Ackley | |
| 2014/0157269 A1* | 6/2014 | Dow | G06F 9/45558 718/1 |
| 2014/0241353 A1 | 8/2014 | Zhang et al. | |
| 2015/0117256 A1* | 4/2015 | Sabaa | H04L 12/4633 370/254 |
| 2015/0128245 A1 | 5/2015 | Brown et al. | |
| 2015/0180824 A1 | 6/2015 | Atanasov | |
| 2016/0105393 A1* | 4/2016 | Thakkar | H04L 67/125 709/220 |
| 2016/0323245 A1 | 11/2016 | Shieh et al. | |
| 2016/0337236 A1 | 11/2016 | Hsu et al. | |
| 2016/0373405 A1 | 12/2016 | Miller et al. | |
| 2017/0295130 A1 | 10/2017 | Mahajan et al. | |
| 2018/0060051 A1* | 3/2018 | Ramalingam | H04L 67/34 |
| 2018/0159758 A1* | 6/2018 | Waizel | H04L 45/02 |
| 2018/0309718 A1* | 10/2018 | Zuo | H04L 61/103 |
| 2019/0036868 A1 | 1/2019 | Chandrashekhar et al. | |
| 2019/0260685 A1 | 8/2019 | Tsirkin | |
| 2020/0076689 A1 | 3/2020 | Chandrashekar | |
| 2020/0329047 A1 | 10/2020 | Powers et al. | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from https://nutanixbible.com/ (Publication date based on indicated capture date by Archive.org; first publication date unknown).

Cano, I. et al., "Curator: Self-Managing Storage for Enterprise Clusters", 14th USENIX Symposium on Networked Systems Design and Implementation, NSDI '17, (Mar. 27, 2017).

Mellor, C., "Nutanix ushers its software onto AWS", Blocks & Files, (May 2019).

Gill, B. et al., "Technical Preview: Nutanix on AWS: Making Lift and Shift Invisible", NEXTConference, (May 2019).

Devarapalli, S. et al., "Xi Clusters: Accerate Your Hybrid Cloud Journey with Nutanix in Public Clouds", NEXTConference, Oct. 2019).

"Configuring alias IP ranges", Google Cloud, (Last updated Jun. 22, 2020).

"Adding secondary IP addresses", Skytap, (Oct. 4, 2017), date retrieved from google.

Apache, "Managing Networks and Traffic", CloudStack Administration Documentation v4.8, (Feb. 17, 2016), date retrieved from google.

Desmouceaux, Y. et al., "Zero-Loss Virtual Machine Migration with IPv6 Segment Routing", 1st Workshop on Segment Routing and Service Function Chaining (SR+SFC 2018), (Nov. 2018).

Le, F. et al., "Experiences Implementing Live VM Migration over the WAN with Multi-Path TCP", (Apr. 29-May 2, 2019).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

Non-Final Office Action dated Sep. 1, 2020 for related U.S. Appl. No. 16/778,725.

Final Office Action dated Feb. 2, 2021 for related U.S. Appl. No. 16/778,725.

(56) References Cited

OTHER PUBLICATIONS

Non-Final Office Action dated May 14, 2021 for related U.S. Appl. No. 16/778,725.
European Search Report dated Jan. 25, 2021 for related EP Application No. 20193500.4.
Conole et al., "Open vSwitch Documentation: Release 2.6.0", Open vSwitch Developers, (Jan. 7, 2017).
Non-Final Office Action dated Aug. 16, 2021 for related U.S. Appl. No. 17/086,376.
Rouse, M. et al. "VLAN (virtual LAN)", WhatIs.com, (Updated on Aug. 2019).
Non-Final Office Action dated Sep. 20, 2021 for related U.S. Appl. No. 17/086,388.
Final Office Action dated Nov. 24, 2021 for related U.S. Appl. No. 16/778,725.
Notice of Allowance for U.S. Appl. No. 17/086,388 dated Aug. 31, 2022.
Notice of Allowance for U.S. Appl. No. 17/086,376 dated Apr. 18, 2022.
Final Office Action for U.S. Appl. No. 17/086,388 dated May 10, 2022.
Notice of Allowance for U.S. Appl. No. 16/778,725 dated Jul. 13, 2022.
Poitras, Steven. "The Nutanix Bible" (Sep. 9, 2022), from https://nutanixbible.com/ (Publication date based on indicated capture date by Archive.org; first publication date unknown).
"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.
Foreign OA for EP Patent Appln. No. 20193500.4 dated Jan. 10, 2023.

\* cited by examiner

2A00

MAC Address Translation Table $210_1$

| Virtual Machine Identifier | Cloud Provider's IP Address | Virtualization System MAC Address | Cloud Provider's MAC Address | |
|---|---|---|---|---|
| VM1 | IP1 | PM1 | SM1 | } Node1 |
| VM2 | IP2 | PM2 | SM2 | } Node2 |
| VM3 | IP3 | PM3 | SM3 | } Node3 |
| ⋮ | ⋮ | ⋮ | ⋮ | |

MAC Address Translation Table $210_2$

| Virtual Machine Identifier | Cloud Provider's IP Address | Virtualization System MAC Address | Cloud Provider's MAC Address | | |
|---|---|---|---|---|---|
| VM1 | IP1 | PM1 | SM1 | } vNIC1 | } Node1 |
| VM2 | IP2 | PM2 | SM2 | } vNIC2 | } Node2 |
| VM3 | IP3 | PM3 | SM3 | } vNIC3 | } Node3 |
| VM4 | IP4 | PM4 | SM3 | } vNIC3 | |
| ⋮ | ⋮ | ⋮ | ⋮ | | |

Routing Table 112

| Cloud Provider's IP Address | Cloud Provider's MAC Address |
|---|---|
| IP1 | SM1 |
| IP2 | SM2 |
| IP3 | SM3 |
| IP4 | SM3 |
| ⋮ | ⋮ |

FIG. 2B

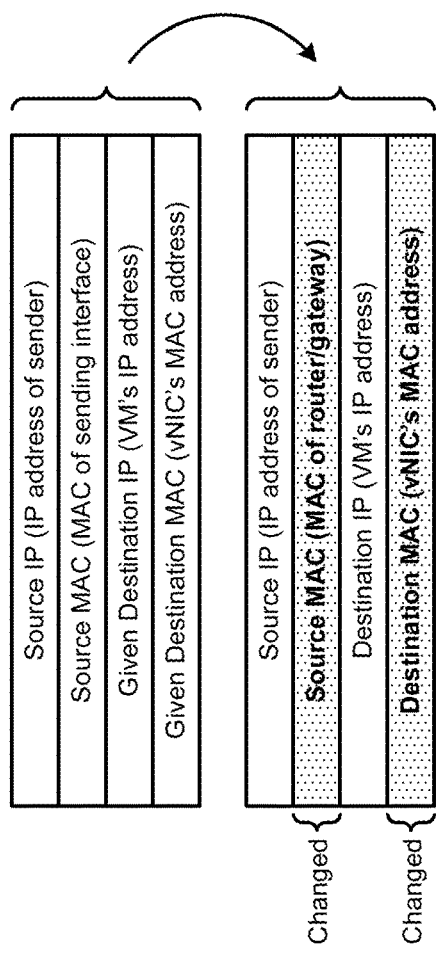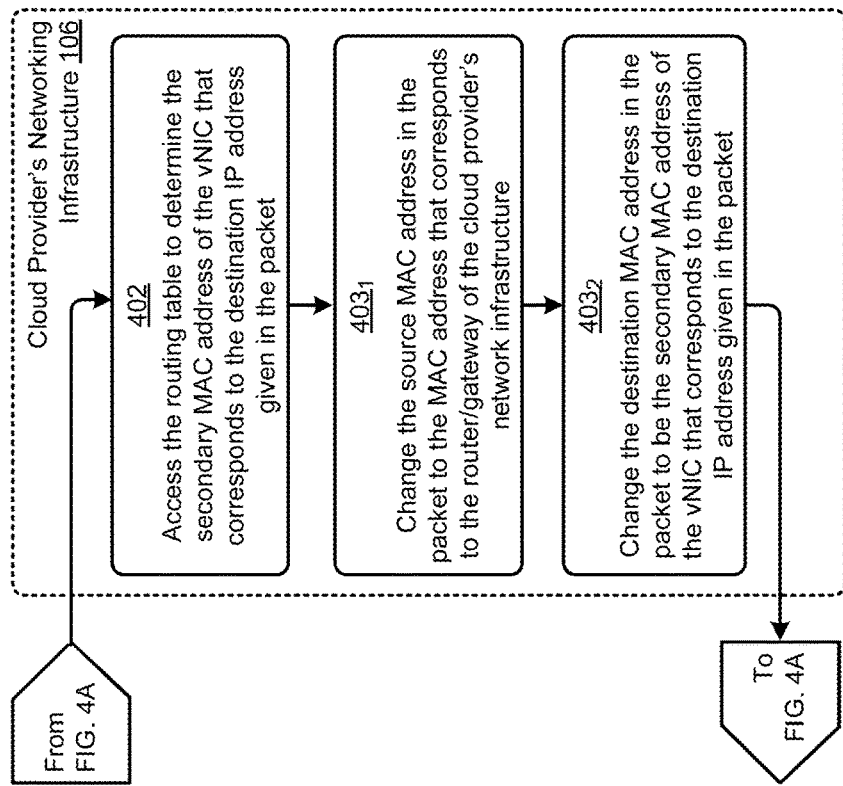
FIG. 4B

VIRTUAL MACHINE MIGRATION IN CLOUD INFRASTRUCTURE NETWORKS

RELATED APPLICATIONS

The present application claims the benefit of priority to U.S. Provisional Patent Application Ser. No. 62/939,569 titled "VIRTUAL MACHINE MIGRATION", filed on Nov. 22, 2019; and the present application claims the benefit of priority to U.S. Provisional Patent Application Ser. No. 62/894,734 titled "VIRTUAL FORWARDING SERVICES", filed Aug. 31, 2019; and the present application claims the benefit of priority to U.S. Provisional Patent Application Ser. No. 62/939,567 titled "HANDLING IP NETWORK ADDRESSES IN A VIRTUALIZATION SYSTEM", filed Nov. 22, 2019; and the present application claims the benefit of priority to U.S. Provisional Patent Application Ser. No. 62/894,675 titled "PREASSIGNING SECONDARY IP ADDRESSES TO VIRTUAL MACHINES", filed Aug. 30, 2019; and the present application is related to co-pending U.S. patent application Ser. No. 16/778,725 titled "HANDLING IP NETWORK ADDRESSES IN A VIRTUALIZATION SYSTEM", filed on even date herewith and issued as U.S. Pat. No. 11,438,280; all of which are hereby incorporated by reference in their entirety.

FIELD

This disclosure relates to cloud computing, and more particularly to techniques for implementing virtual machine migration in cloud infrastructure networks services.

BACKGROUND

When implementing a multitenant virtualized resource system that avails of a cloud provider's networking infrastructure, network address translation is often performed so as to permit newly-created virtual machines to use the cloud provider's networking infrastructure while still allowing for virtual machines to be assigned virtual IP addresses. In many such cases network address translation relies on inbound and outbound network address translation between a set of primary IP addresses (i.e., the IP addresses assigned by the multitenant virtualized resource system to a virtual machine) and a set of secondary IP addresses (i.e., IP addresses that owned by and available for use in the aforementioned cloud provider's networking infrastructure).

When moving a virtual machine from one node to another node (e.g., as part of virtual machine migration activities in cloud infrastructure networks) the location of the VM is changed, and thus, some mechanism needs to account for this change.

Unfortunately, moving a virtual machine that is addressed by a cloud provider's networking addresses means that changes need to be made to incoming and outgoing packets, as well as in the cloud provider's networking equipment. Furthermore, when moving a virtual machine from one node to another node of a multitenant environment, it takes a period of time for changes to ripple through the networking equipment, and as such, there is a period of time during which traffic that is inbound to the virtual machine could become unrouteable since the virtual machine has moved to a different location. In this timeframe, in-flight packets can arrive at the wrong location, and thus be dropped or deemed to be unrouteable, which in turn can cause service interruptions, possibly leading to downtime.

What is needed is a technique or techniques that avoid such unwanted effects and/or network interruptions when migrating a virtual machine from one node to another node.

SUMMARY

The present disclosure describes techniques used in systems, methods, and in computer program products for virtual forwarding services, which techniques advance the relevant technologies to address technological issues with legacy approaches. More specifically, the present disclosure describes techniques used in systems, methods, and in computer program products for migrating virtual machines. Certain embodiments are directed to technological solutions for maintaining cloud provider networking addresses that correlate to virtual machine networking addresses when migrating a virtual machine from one node to another node.

The disclosed embodiments modify and improve over legacy approaches. In particular, the herein-disclosed techniques provide technical solutions that address the technical problems attendant to the fact that the number of cloud-provided networking addresses are far fewer than the number needed by virtual machines in a virtualization system. Such technical solutions involve specific implementations (i.e., data organization, data communication paths, module-to-module interrelationships, etc.) that relate to the hardware and software arts for improving computer functionality.

Many of the herein-disclosed embodiments for maintaining cloud provider networking addresses that correlate to virtual machine networking addresses in a virtualization system are technological solutions pertaining to technological problems that arise in the hardware and software arts that underlie cloud computing. Aspects of the present disclosure achieve performance and other improvements in peripheral technical fields including, but not limited to, hyperconverged computing platform networking and hyperconverged computing platform management.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

FIG. 2A presents MAC address translation table models that are used to correlate cloud provider networking addresses to network-accessible entities in a virtualization system, according to some embodiments.

FIG. 2B presents a routing table model that is used to route traffic to network-accessible entities in a virtualization system, according to an embodiment.

FIG. 4A and FIG. 4B illustrate an example context for virtualized computing node operations over inbound network packets as used in systems that correlate cloud provider networking addresses to network-accessible entities in a virtualization system, according to an embodiment.

DETAILED DESCRIPTION

Figure 1:
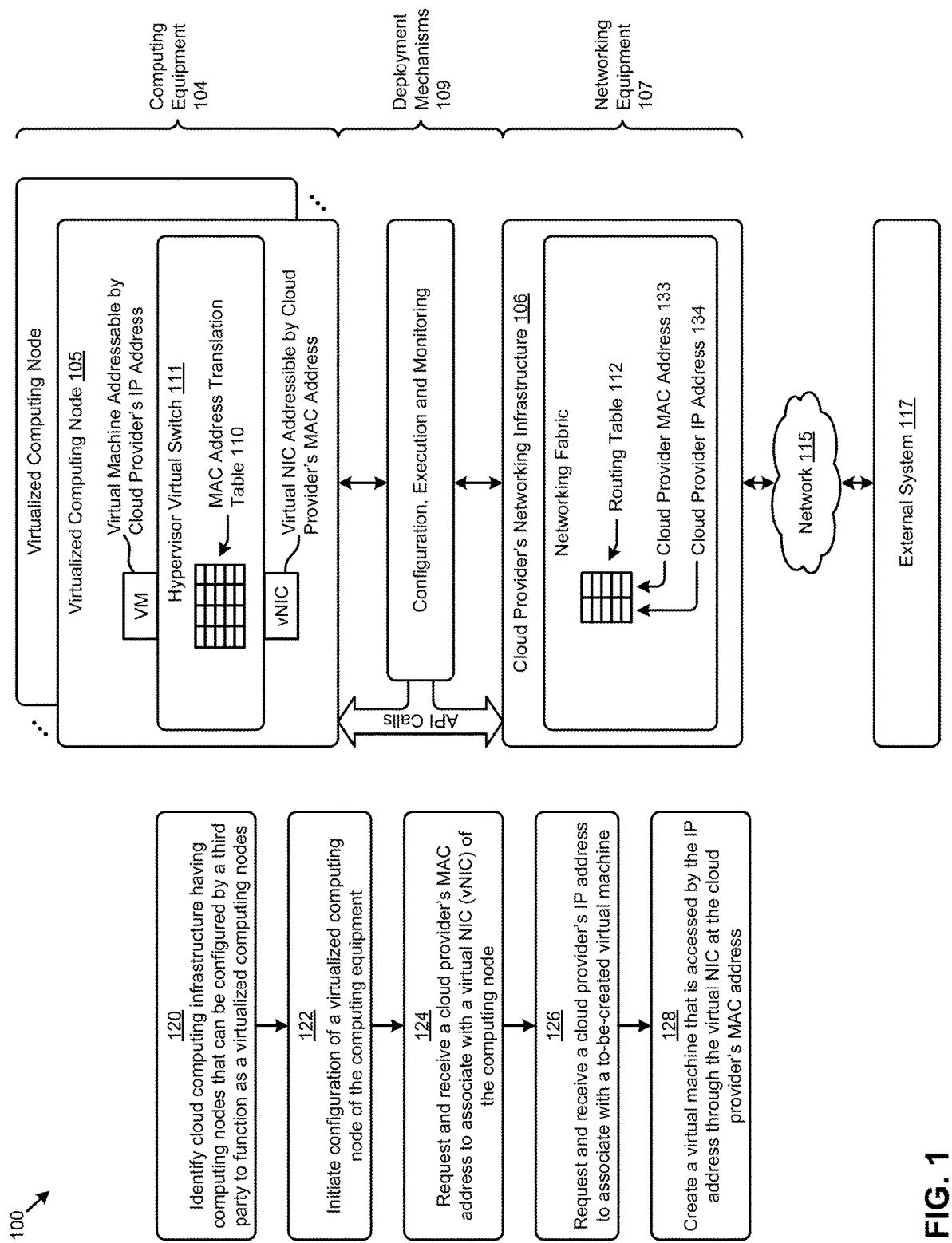
FIG. 1 exemplifies an environment in which embodiments of the present disclosure can operate.

Aspects of the present disclosure solve problems associated with using computer systems in which the number of cloud-provided networking addresses are far fewer than the number needed by virtual machines in a virtualization system. Some embodiments are directed to approaches for maintaining cloud provider networking addresses that correlate to virtual machine networking addresses in a virtualization system. The accompanying figures and discussions herein present example environments, systems, methods, and computer program products that correlate cloud provider networking addresses to network-accessible entities in a virtualization system.

Overview

When deploying a virtualization system onto a "bare metal" computing node of a cloud provider, a wide range of the cloud provider's services are needed to "instantiate" the virtualization system. Fortunately, cloud computing providers publish application programming interfaces (APIs) that facilitate deployment of a virtualization system onto a "bare metal" computing node. For example, a cloud provider might publish an API that, when called, retrieves an "instance" (i.e., a runnable set of computer instructions) and loads the instance onto an available computing node. As another example, a cloud provider might publish an API that, when called, initiates execution of the instance that was just loaded onto the available computing node. As yet another example, a cloud provider might publish an API that packages local results from execution of the instance and store the results in a network-accessible location. The deployer can then access the network-accessible location to see the results.

In some cases, such as are discussed herein, an "instance" might be an entire virtualization environment, complete with a full complement of virtualization components such as virtual machine computing capabilities, virtual networking capabilities, a hypervisor that virtualizes many or all aspects of an operating system, virtual memory, virtual I/O (input/output or IO) devices, and so on. In some cases, a virtualization system might be self-contained in a manner such that all computing features needed (e.g., computer MIPS, local storage, etc.) to accomplish a particular computing task are supplied by the bare metal computing node. However, in many cases, a particular virtualization system might need networking features beyond those supplied by the bare metal computing node so as to access resources outside of the bare metal node. In such cases, the virtualization system needs to access the cloud provider's networking infrastructure.

Unfortunately, there are many scenarios where the features corresponding the cloud-provided networking infrastructure are insufficient. As one example, the cloud-provided networking infrastructure might include a limited set of networking access points (e.g., IP addresses), whereas the virtualization environment might need to define a larger, possibly much larger set of (virtual) networking access points (e.g., a large number of virtual machines). This raises the need for the virtualization system to manage network communications to and from the cloud-provided networking infrastructure. To illustrate, a virtualization system might create many hundreds or thousands of virtual machines (VMs), each of which individual virtual machines are to be accessed via a correspondingly large set of VM-specific internet protocol (IP) address and media address control (MAC) addresses, yet the cloud-provided networking infrastructure might only have a much smaller set of MAC addresses available. This sets up a one-to-many situation where a single MAC address provided by the cloud provider needs to be mapped to many networking addresses corresponding to many VMs.

Techniques that address this one-to-many mappings are shown and described as pertain to the figures.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 exemplifies an environment 100 in which embodiments of the present disclosure can operate. As an option, one or more variations of environment 100 or one or more variations of the shown steps may be implemented in the context of the architecture and functionality of the embodiments described herein.

FIG. 1 illustrates a context and steps that pertain to maintaining cloud provider networking addresses that correlate to virtual machine networking addresses in a virtualization system. Specifically, the figure is being presented to illustrate the juxtaposition of a deployment stack as well as to illustrate one example set of steps to initially configure a virtualization environment (e.g., configured from Nutanix's virtualization system components) on top of networking equipment made available by a cloud computing provider (e.g., Amazon).

The embodiment shown in FIG. 1 is merely one example. As shown, the environment comprises computing equipment 104 that are situated atop cloud-provided networking equipment 107. Various deployment mechanisms 109 are depicted. Such mechanisms include techniques for configuration, execution and monitoring. More specifically, such mechanisms include techniques for initial configuration of a virtualized computing node 105 onto the computing equipment 104, techniques for invoking runnable computing entities in a virtualization environment, and techniques for monitoring the execution. As used herein, a virtualized computing node 105 is an instruction processor (e.g., CPU) onto which software comprising a virtualization system (e.g., a host operating system and a hypervisor) is installed. As such, a virtualized computing node 105 can be formed by loading virtualization software onto unconfigured (e.g., "bare metal") computing equipment.

As shown API calls can be used to communicate between the virtualized computing node 105 and the cloud provider's networking infrastructure 106. More specifically, the API calls can be used to initialize and maintain a routing table 112 that is situated within the networking fabric of the cloud provider's networking infrastructure. Further the API calls can be used to request and retrieve network addresses that derive from the cloud provider's networking infrastructure. In some situations, a single API call is used to request a single IP address or MAC address. In other situations, a single API call is used to request a group (e.g., pool) of IP addresses that correspond to a particular MAC address of the cloud provider's networking infrastructure. These addresses are used by a hypervisor virtual switch 111 to perform inbound and outbound network traffic routing. As an example, hypervisor virtual switch 111 can route traffic to a virtual machine that is addressable at a IP address allocated by a cloud provider.

As shown, the cloud provider's networking infrastructure 106 maintains a routing table that includes a correspondence between a particular MAC address and a particular IP address. In many cases the routing table includes a correspondence between a particular single MAC address and multiple IP addresses in a one-to-many correspondence. This one-to-many correspondence allows a single networking interface to serve many virtual machines. As such, the virtualized system that is installed onto computing equipment 104 to instantiate virtualized computing node 105 can freely create a large number of virtual machines, each of which are associated with a single virtual network interface (vNIC).

An example of a configuration of such a virtualized system that has been installed onto computing equipment 104 is given in the context and flow of step 120, step 122, step 124, step 126 and step 128. Specifically, the aforementioned flow operates within a context of the shown cloud computing infrastructure that provides computing nodes (e.g., bare metal nodes) that can be configured by a third party (step 120).

In the example of FIG. 1, the computing node or nodes are configured to function as virtualized computing nodes. Operation of one or more of the shown operations serve to initialize or "bring-up" a node, even if the node initially has no software other than its basic input/output subsystem (BIOS). As a pertinent bring-up example, step 122 loads virtualization system code, including a host operating system, one or more guest operating systems, a hypervisor, and a library of virtualized components, any or all of which are configured to operate on the particular hardware that comprises the subject node. Certain components of the virtualization system (e.g., the hypervisor, monitoring agents, etc.) are "booted-up". Next, in order to initialize a virtual NIC, at step 124, an API is called to request and receive a cloud provider's MAC address 133. The operation of the API causes this MAC address to be recorded in one or more routing tables of the networking fabric. Strictly as one example, routing table 112 is shown as having multiple rows and multiple columns, where a particular row and column can store a cloud provider's MAC address.

This cloud provider's MAC address 133 is also stored in the hypervisor virtual switch 111. In the example shown the cloud provider's MAC address 133 is stored as an entry in the MAC address translation table 110 (MAT). Further in the example shown, the cloud provider's MAC address 133 is used to initialize the vNIC of the virtualized computing node

105. As such, traffic that is destined for the vNIC of the virtualized computing node can be directed through the cloud provider's networking infrastructure (e.g., using layer 2 switching).

Although the foregoing provides a layer 2 switching technique, packets include an IP address as well, which IP address is associated in a one-to-one relationship with a virtual machine, and such a unique IP address is needed in order to create a virtual machine. As such, step 126 serves to request and receive IP addresses from the cloud provider, which cloud provider's IP address 134 is then associated with a to-be-created virtual machine. Step 128 then serves to create a virtual machine that is accessible at the cloud provider's IP address 134 through the virtual NIC that is addressable by the cloud provider's MAC address 133.

Since the foregoing virtual machine has a unique IP address and is accessible through the aforementioned vNIC, network traffic packets can be addressed to the virtual machine, which network traffic packets can be sent from any external system 117 through the Internet or any other network 115.

The foregoing discussion of FIG. 1 includes a description of techniques by which network traffic packets can be addressed to a particular virtual machine that is situated at a particular NIC with a particular cloud provider's MAC address. Furthermore FIG. 1 discloses a hypervisor virtual switch 111 that employs a MAC address translation table 110 that serves to route the packet to the intended virtual machine. Various examples of a MAC address translation table 110 as well as techniques that serve to route the packet to the intended virtual machine are disclosed as pertains to the following FIG. 2A.

FIG. 2A presents MAC address translation table models 2A00 that are used to correlate cloud provider networking addresses to network-accessible entities in a virtualization system. As an option, one or more variations of MAC address translation table models 2A00 or any aspect thereof may be implemented in the context of the architecture and functionality of the embodiments described herein. The MAC address translation table models 2A00 or any aspect thereof may be implemented in any environment.

FIG. 2A illustrates aspects pertaining to maintaining cloud provider networking addresses that correlate to virtual machine networking addresses in a virtualization system. The figure is being presented with respect to its contribution to routing packets to one of many virtual machines that may be accessed through a particular virtual NIC of a virtualization system.

As shown in MAC address translation table 2101, each row correlates to a particular virtualization system entity. In a virtualization system such as is depicted in FIG. 1, each virtual machine is assigned a virtualization system media access control address. MAC address translation table 2101 depicts a correspondence between (1) a virtualization system media access control address that is assigned to a virtual machine and (2) a cloud provider's MAC address. For routing a packet from a particular vNIC at which the packet has arrived, the hypervisor virtual switch 111 (referring again to FIG. 1) accesses its MAC address translation table (MAT), looks up the row that contains the IP address of the intended virtual machine, and routes the packet to the intended virtual machine using the combination of the VM's IP address and the looked-up virtualization system MAC address.

The columnar organization of MAC lookup tables such as are depicted in FIG. 2A supports the scenario where there are multiple VMs that are accessed via a common vNIC. Specifically, since the columnar organization of the MAT table includes both (1) a cloud provider's IP address that is assigned to a virtual machine, and (2) a virtualization system media access control address that is assigned to the same virtual machine, a hypervisor virtual switch can use layer 2 switching to route a direct to the intended virtual machine. In some cases, and as shown, a MAT table may contain a virtual machine identifier. Such an identifier can be conveniently used for VM-level monitoring.

In many situations, a given node will support multiple virtual machines, and each virtual machine is assigned a particular virtualization system media access control address. However, it often happens that two or more of the virtual machines at a given node will be associated with a common vNIC. As such it can happen that several rows correlate to one particular node. This is shown in the depiction of MAC address translation table 2102. Specifically, while there is shown a one-to-one correspondence between a node and a vNIC (e.g., Node1 corresponds to vNIC1, Node2 corresponds to vNIC2, etc.) it is also shown that Node3 hosts two VMs, each of which are accessed through vNIC3. When routing a packet from a particular vNIC at which the packet has arrived, the hypervisor virtual switch 111 (referring again to FIG. 1) accesses its MAC address translation (MAT) table, looks up the row that contains the IP address of the intended virtual machine, and routes the packet to the intended virtual machine using the combination of the VM's IP address and the looked-up virtualization system MAC address. In this scenario, the packet is routed unambiguously to the correct VM using layer 2 switching.

The foregoing discussion of FIG. 2A discloses a MAC address table organization that serves to route a packet from a particular vNIC at a particular cloud provider's MAC address to a VM served by that vNIC. A different table with a different organization is needed within the cloud provider's networking fabric such that the cloud provider's networking fabric is able to route a packet from an external system to the correct vNIC. Such a table and discussion thereof are given as pertains to the FIG. 2B.

FIG. 2B presents a routing table model 2B00 that is used to route traffic to network-accessible entities in a virtualization system. As an option, one or more variations of routing table model 2B00 or any aspect thereof may be implemented in the context of the architecture and functionality of the embodiments described herein. The routing table model 2B00 or any aspect thereof may be implemented in any environment.

FIG. 2B illustrates organization of a routing table that is used to route a packet from an external system to a vNIC of a virtualization system. As shown, the routing table 112 has two columns: (1) a cloud provider IP address and (2) a cloud provider MAC address. Referring again to the API calls as discussed as pertains to FIG. 1, a particular one or more API calls are made from the virtualization system to the cloud provider. As earlier indicated, the API calls can be used to request and retrieve one or more network addresses that derive from the cloud provider's networking infrastructure. These addresses are (1) a cloud provider IP address, which is used to uniquely address a virtual machine, and (2) a cloud provider MAC address, which is used to uniquely address a vNIC. The shown routing table makes a correspondence between the two addresses by populating them into the same row. The tabular organization is merely illustrative and other techniques can be used to maintain the correspondence between the two addresses.

It must be noted that, regardless of the particular technique to maintain a particular correspondence between the MAC address and the IP address, there is a one-to-many correspondence where a single MAC address provided by the cloud provider needs to be mapped to many networking addresses corresponding to many VMs.

The foregoing discussions of FIG. 2A and FIG. 2B broach the concepts of outbound routing (e.g., routing of packets that originate from a VM) and inbound routing (e.g., routing of packets that are intended for a VM). Specific techniques using the correspondences that are captured in the foregoing data structures are discussed in further detail in FIG. 3A, FIG. 3B, FIG. 4A, and FIG. 4B.

Figure 3A:
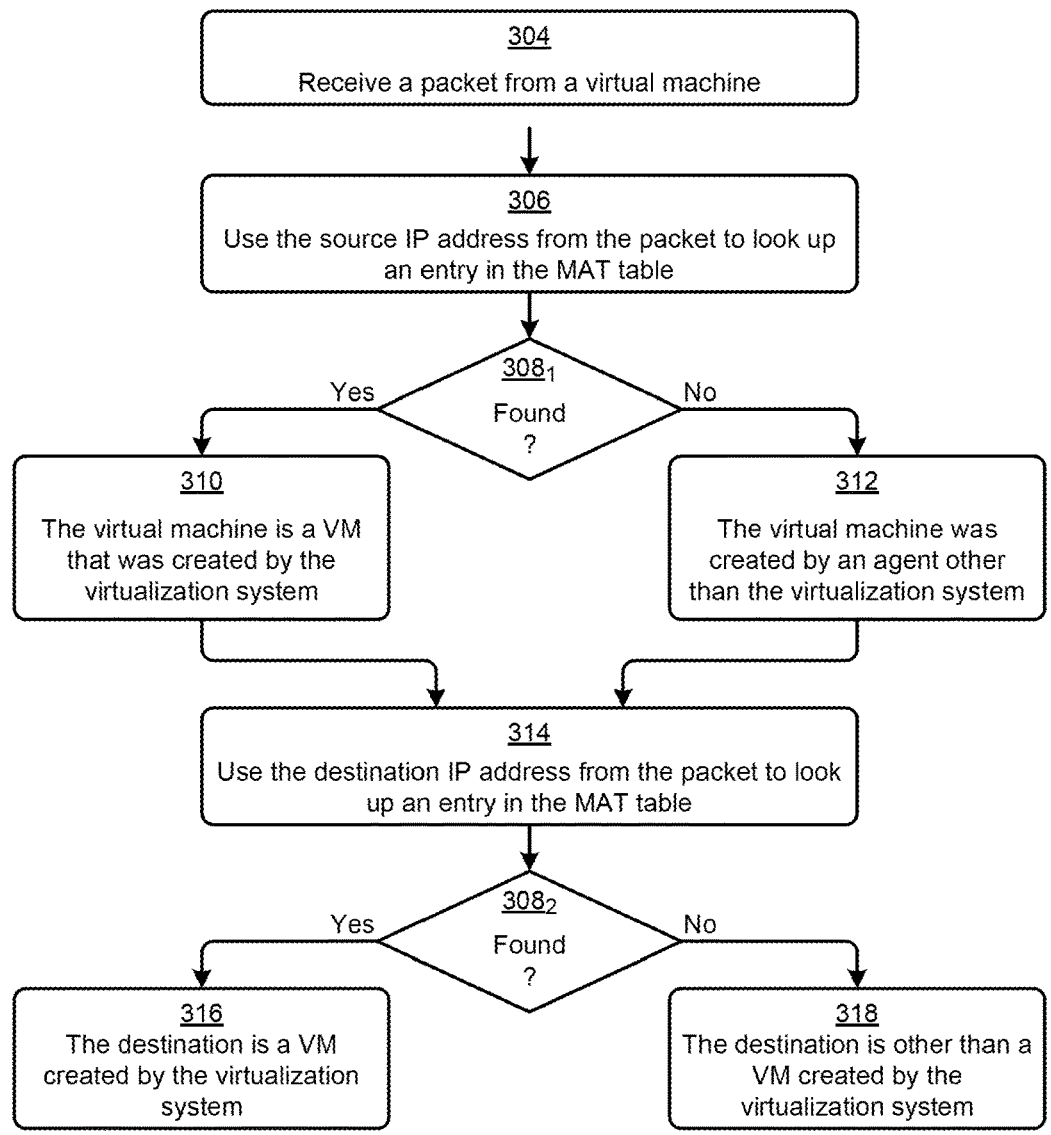
FIG. 3A is a flowchart depicting operations used in systems that correlate cloud provider networking addresses to network-accessible entities in a virtualization system, according to an embodiment.

FIG. 3A is a flowchart 3A00 depicting operations used in systems that correlate cloud provider networking addresses to network-accessible entities in a virtualization system. The figure is being presented to explain how a MAC address translation table can be used to determine whether or not a network accessible entity is a VM created by the virtualization system. This determination is needed since the MAC addresses of a VM created by the virtualization system are logical constructs that do not refer to actual hardware MAC addresses.

When a MAC address in a packet can be determined to be a MAC addresses of a VM created by the virtualization system, that MAC address can be translated to an actual hardware MAC address. More specifically, when a MAC address in a packet can be determined to be a MAC addresses of a VM created by the virtualization system, that MAC address can be translated to a cloud provider's media access control address. The depicted technique accesses a MAT table to determine whether the subject MAC address is a MAC address that was generated by the virtualization system when creating a virtual machine.

The flow is shown and discussed as pertains to outbound traffic. However, the technique can be used in any context to determine if a MAC address corresponds to a VM that was created by the virtualization system. The shown flow commences at step 304, upon receipt of a IP packet from a virtual machine. The IP packet contains a source IP address, a source MAC address, a destination IP address, and a destination MAC address. At step 306, the source IP address is used as a subject address to find a corresponding entry in the MAT table. If such an entry is found, the "Yes" branch of decision 3081 is taken, and the sender is thus known to be a VM that was created by the virtualization system (step 310). Otherwise, the "No" branch is taken, and the sender is known to be an entity that was not created by the virtualization system (at determination 312). Such a determination is used when substituting source MAC addresses. Specifics of source MAC address substitutions are further discussed as pertains to FIG. 3B.

There are many other ways to look up an entry in the MAT table. However, in the foregoing embodiments, even when there is a one-to-many relationship between a single MAC address (e.g., the MAC address of a vNIC) and multiple IP addresses (e.g., any number of virtual machines that are addressed through that vNIC), a lookup by IP address returns at most one MAT table entry.

Continuing this example flow, the foregoing technique to access a MAT table—to determine whether the subject MAC address is a MAC address that was generated by the virtualization system or not—can also be used with respect to destination MAC addresses. Specifically, at step 314, the destination IP address is used as a subject IP address to find a corresponding entry in the MAT table. If there is such an entry, the "Yes" branch of decision 3082 is taken, and the destination is thus known to be a VM that was created by the virtualization system (step 316). Otherwise, the "No" branch is taken, and the sender is known to be an entity that was not created by the virtualization system (at determination 318). Such a determination is used when substituting MAC addresses. Specifics of destination MAC address substitutions are further discussed as pertains to FIG. 3B.

Figure 3B:
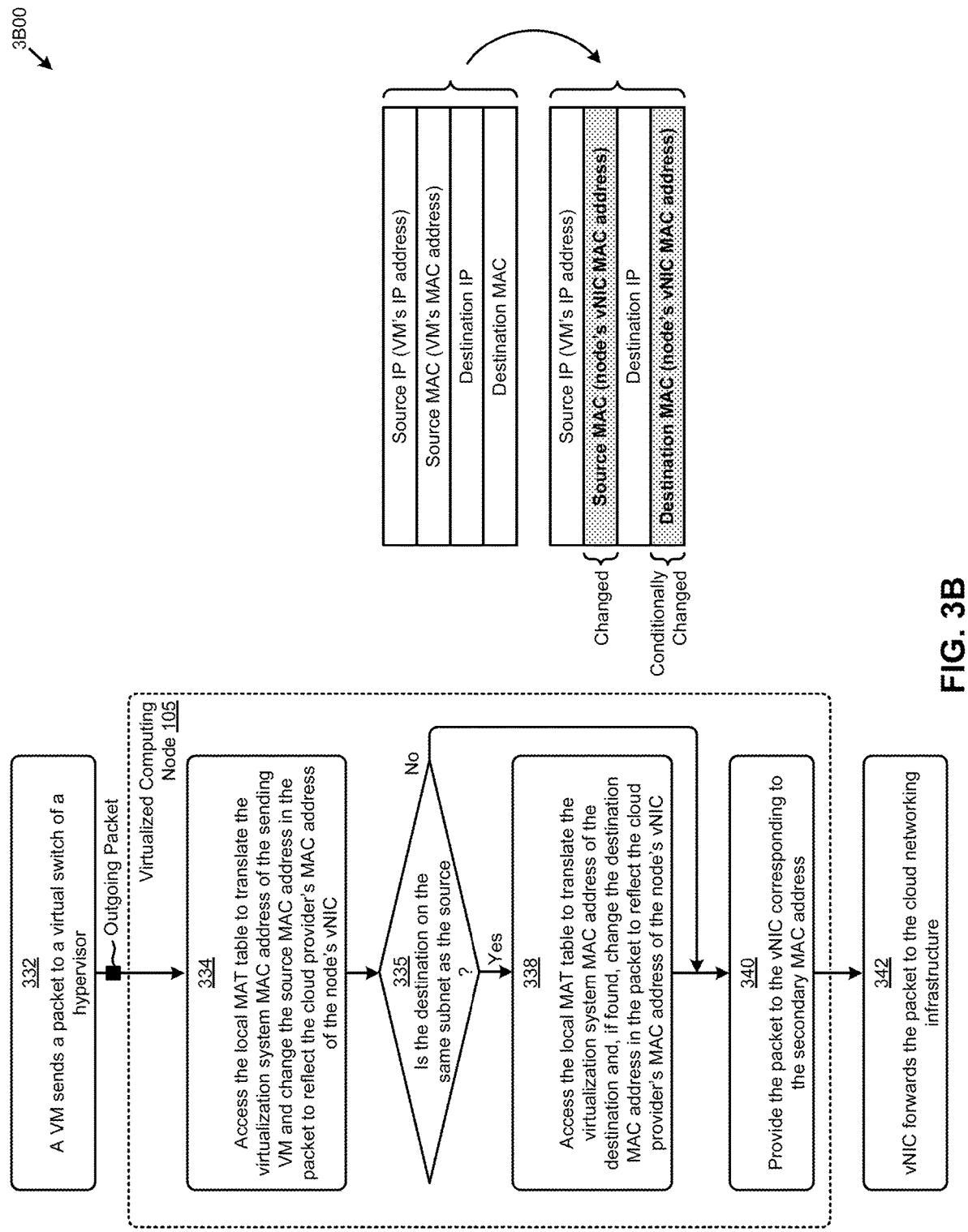
FIG. 3B illustrates example virtual switch operations performed over outbound network packets as used in systems that correlate cloud provider networking addresses to network-accessible entities in a virtualization system, according to an embodiment.

FIG. 3B illustrates example virtual switch operations 3B00 performed over outbound network packets as used in systems that correlate cloud provider networking addresses to network-accessible entities in a virtualization system. As an option, one or more variations of the virtual switch operations over outbound network packets or any aspect thereof may be implemented in the context of the architecture and functionality of the embodiments described herein. The virtual switch operations over outbound network packets or any aspect thereof may be implemented in any environment.

FIG. 3B illustrates aspects pertaining to routing of a packet that originates from a VM. Specifically, the figure and corresponding discussion show and describe how a packet is originally addressed and how it is modified by a virtual switch of a virtualized computing node.

The shown flow commences at step 332, upon the event that a virtual machine generates an outgoing packet and sends it to a virtual switch of a virtualized computing node. Such a packet includes a destination in the form of a destination IP address and a destination MAC address. The outgoing packet also includes the sender's addressing information—specifically the IP address of the sending VM and the MAC address of the sending VM—and the packet is presented to the virtual switch. The virtual switch then accesses its MAT table to translate the virtualization system MAC address into a cloud provider's MAC address. If the sending VM is a VM that was created by the virtualization system, then the sender's MAC address is translated from the VM's virtualization system MAC address (sometimes referred to herein as a "primary MAC address") to a corresponding cloud provider's MAC address (sometimes referred to herein as a "secondary MAC address"). This translation and change (step 334) is needed because the virtualization system MAC address is merely a logical construction of the virtualization system, whereas the corresponding cloud provider's MAC address is a MAC address of an actual interface to which packets can be routed from an external system.

Referring to decision 335 of FIG. 3A, if the sender and the destination are both on the same subnet, then the "Yes" branch is taken, and the destination MAC address is conditionally changed at step 338. Specifically, if the destination MAC address is found in the MAT table, then the outbound packet is modified to include the secondary vNIC address, which is a MAC address of an actual interface to which packets can be routed using the cloud provider's networking infrastructure. On the other hand, if the sender and the destination are not on the same subnet, then the "No" branch of decision 335 is taken, and the destination MAC address is not changed.

After the outgoing packet has been modified, the packet can then be provided (at step 340) by the virtual switch to the vNIC that is associated with the secondary MAC address. The vNIC in turn forwards the packet to the cloud networking infrastructure (at step 342), which in turn routes the packet onward towards its destination.

Figure 4A:
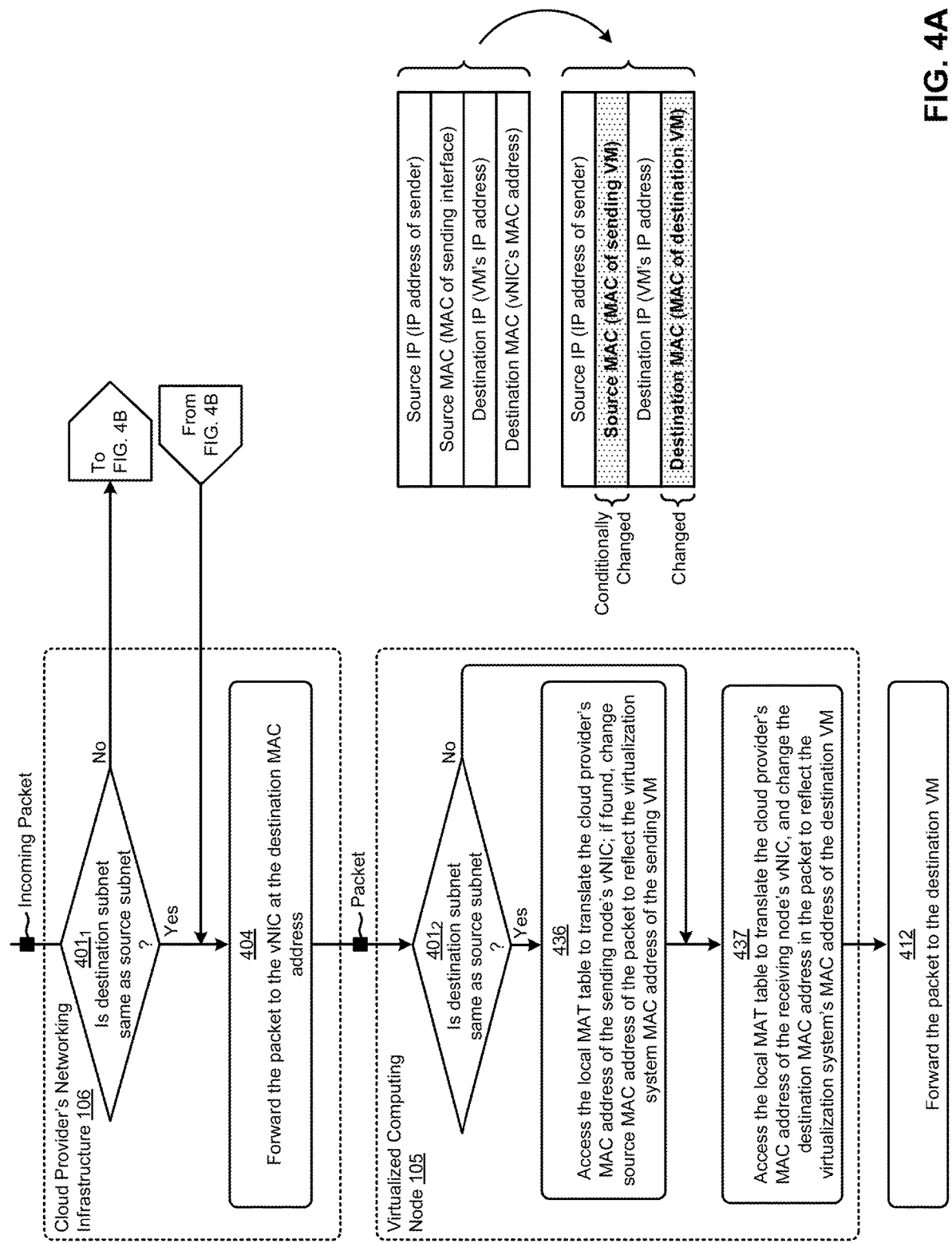

FIG. 4A illustrates an example context for virtualized computing node operations over inbound network packets as used in systems that correlate cloud provider networking addresses to network-accessible entities in a virtualization system. As an option, one or more variations of virtualized computing node operations over inbound network packets or any aspect thereof may be implemented in the context of the architecture and functionality of the embodiments described herein. The virtualized computing node operations over inbound network packets or any aspect thereof may be implemented in any environment.

The shown flow begins when the cloud provider's networking infrastructure 106 receives an incoming packet, possibly from an external system or possibly from within the cloud provider's networking infrastructure itself. Regardless of the source of the packet, the packet is received at some networking device within the cloud provider's networking infrastructure and, at that point, a test is carried out to determine if the source and destination are on the same subnet. Decision 4011 serves to route the flow based on the result of the test. Specifically, if the source and destination are not on the same subnet, then the "No" path is taken, and the steps of FIG. 4B are carried out. Otherwise, if the source and destination are on the same subnet, then the "Yes" path is taken, and the flow goes to step 404—without carrying out the steps of FIG. 4B.

At step 404 the packet has enough destination information in it to be routed to a vNIC that corresponds to the destination MAC address given in the packet, after which the packet is received at the virtualized computing node 105. The packet is again, in decision 4012, subjected to a test to determine if the source and destination are on the same subnet. Decision 4012 serves to route the flow based on the result of the test. Specifically, if the source and destination are on the same subnet, then the "Yes" path is taken, and step 436 is carried out to conditionally change the source MAC address to reflect the virtualization system MAC address of the sending VM. Otherwise, the "No" path is taken, and the flow goes to step 437, which translates the address from the cloud provider's vNIC MAC address to a virtualization system MAC address. The translated address is changed in the destination MAC address in the packet to reflect the virtualization system MAC address of the destination VM.

After making such changes to the address field(s) of the incoming packet, the modified packet now includes both the cloud provider's IP address of the VM (sometimes referred to herein as a secondary IP address or sometimes referred to herein as a preassigned IP address) as well as the virtualization system media access control address such that it can be forwarded (at step 412) to the VM.

FIG. 4B includes steps that are carried out by the cloud provider's networking infrastructure 106 so as to route traffic that might be destined for an entity of the virtualization system. As shown, at step 402, a routing table such as routing table 112 is accessed to determine the secondary MAC address of the vNIC that corresponds to the destination IP address. Using the information in the routing table, the destination vNIC can be determined. Next, the source MAC address in the packet is changed (step 403$_1$) to be the MAC address of the router/gateway of the cloud provider's networking infrastructure the determined destination vNIC. Also, the destination MAC address in the packet is changed to be the secondary MAC address of the vNIC that corresponds to the destination IP address given in the packet (step 403$_2$). The packet is then ready to be forwarded (step 404 of FIG. 4A) to the determined destination vNIC MAC address.

Figure 5A:
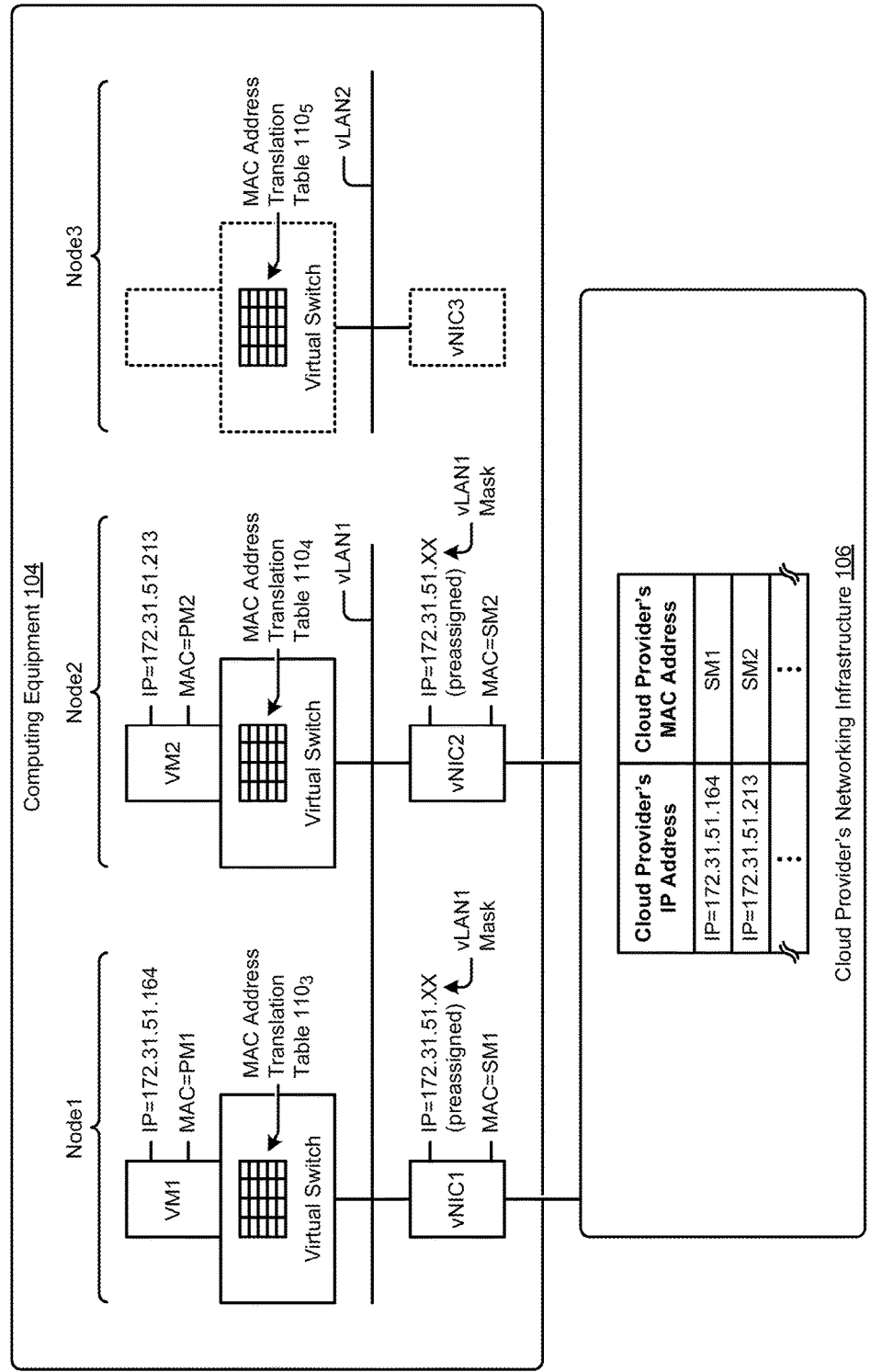
FIG. 5A illustrates an example vLAN formation technique as used in systems that correlate cloud provider networking addresses to network-accessible entities in a virtualization system, according to an embodiment.

FIG. 5A illustrates an example vLAN formation technique 5A00 as used in systems that correlate cloud provider networking addresses to network-accessible entities in a virtualization system. As an option, one or more variations of vLAN formation technique 5A00 or any aspect thereof may be implemented in the context of the architecture and functionality of the embodiments described herein. The vLAN formation technique 5A00 or any aspect thereof may be implemented in any environment.

FIG. 5A illustrates aspects pertaining to maintaining cloud provider networking addresses that correlate to virtual machine networking addresses in a virtualization system. Specifically, the figure is being presented with respect to its contribution to addressing the problem of forming and routing to virtual VLANs in a virtualization system.

As used herein a vLAN (virtual LAN) is a logical construction that groups together collections of virtual machines and other virtualized devices. VLANs are often formed to address functional and/or performance and/or security requirements of a virtualization system. VLANs can be used to provide security within a virtualization system by allowing a high degree of control over which virtualized devices have access to each other.

The example shown in FIG. 5A depicts how multiple nodes can share a particular VLAN (e.g., the shown vLAN1). The example of FIG. 5A also depicts how a second or Nth vLAN (e.g., vLAN2) can be formed.

As indicated above, a vLAN is a logical construction that groups together collections of virtual machines and other virtualized devices. FIG. 5A depicts this by showing that VM1 and VM2 are associated with vLAN1. In this illustrative example, the VM1 is access through vNIC1 and VM2 is accessed through vNIC2. Packets are routed to the correct vNIC since each vNIC is configured at a different secondary MAC address, and because each vNIC has an IP address and mask (e.g. a preassigned secondary IP address and VLAN mask). Specifically, a packet that is destined for IP address of 172.31.51.164 and MAC address of SM1 would be routed to and forwarded by vNIC1 because the IP address (after masking) and secondary MAC address both match. Similarly, a packet that is destined for IP address of 172.31.51.213 and secondary MAC address of SM2 would be routed to and forwarded by vNIC2 because the IP address (after masking) and MAC address both match.

When a packet arrives at the correct virtual node (e.g., Node1), that node's MAT table (e.g., MAC address translation table 110$_3$) is accessed and the secondary MAC address (e.g., SM1) is translated into its corresponding primary MAC address (PM1) based on the destination IP address in the packet. This process is shown and described in step 436 and step 437 of FIG. 4A. The same process is used when a packet correctly arrives at Node2. Specifically, when a packet arrives at the correct virtual node (e.g., Node2), that node's MAT table (e.g., MAC address translation table 110$_4$) is accessed and the secondary MAC address (e.g., SM2) is translated into its corresponding primary MAC address (PM2) based on the destination IP address in the packet.

Many virtualized system configurations are intended to support multiple tenants. In some cases, use of separate computing equipment and separate networking equipment serves to isolate one tenant from another tenant. However, this can lead to inefficiencies. One improved approach to isolate one tenant from another tenant is to assign a first set of virtualized computing entities (e.g., VMs) of a first tenant to interface to a first vLAN. Then, for a second tenant, assign a second set of virtualized computing entities (e.g., VMs) of a second tenant to interface to a second vLAN. As such, a virtualization system might need to create any number of vLANs to isolate the virtualized entities of a first tenant from the virtualized entities of a second tenant.

One mechanism for isolating the virtualized entities of a first tenant from the virtualized entities of a second tenant, while avoiding inefficiencies that arise from coarse equipment assignments is depicted in the example of FIG. 5A. Although the example of FIG. 5A depicts only a second vLAN (e.g., vLAN2) a large number of vLANs can be formed for network communication between any number of computing entities that are operational on the computing equipment 104. Moreover, a large number of vLANs can be supported on a single node. More specifically, a single virtual node may support multiple disjoint sets of virtual machines (e.g., belonging to, or owned by different tenants), and each disjoint set can be associated with a different vLAN.

When forming a new vLAN, the virtualization system calls an API to request a pool of multiple IP addresses that correlate to a subnet of the cloud provider's networking infrastructure. More specifically, when requesting a pool of multiple IP addresses, each IP address returned will be an IP address that correlates to the cloud provider's MAC address of the subnet.

As an example, when forming new vLAN2, a separate vLAN from vLAN1, the virtualization system will form a new a MAC address translation table (MAC address translation table 1105) based an API call to request a pool of multiple IP addresses that correlate to a subnet of the cloud provider's networking infrastructure. More specifically, when forming new vLAN2, each IP address of the pool will be an IP address that correlates to the cloud provider's MAC address of a subnet that is different than the subnet of vLAN1.

Use of a vLAN is merely one way to address performance and other networking issues. Another way is route through multiple networking interfaces that serve the same virtual node. This technique is shown and discussed as pertains to FIG. 5B.

Figure 5B:
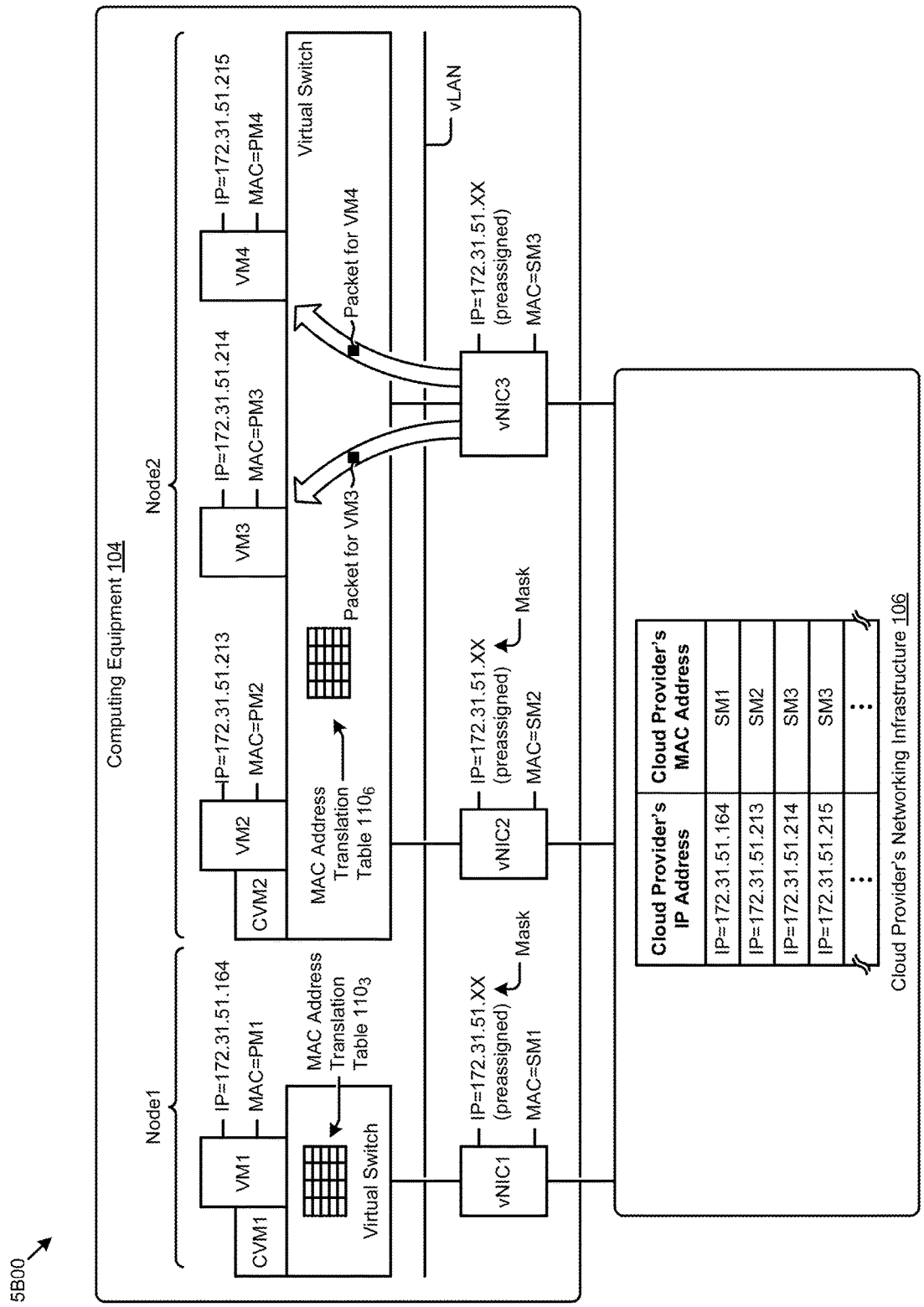
FIG. 5B illustrates a virtualization system packet routing technique as used in configurations that have two or more virtual networking interfaces operating on a single virtual node, according to an embodiment.

FIG. 5B illustrates a virtualization system packet routing technique 5B00 as used in configurations that have two or more virtual networking interfaces operating on a single virtual node. As an option, one or more variations of virtualization system packet routing technique 5B00 or any aspect thereof may be implemented in the context of the architecture and functionality of the embodiments described herein. The virtualization system packet routing technique 5B00 or any aspect thereof may be implemented in any environment.

The example configuration of FIG. 5B shows a single virtual (e.g., the shown Node2) as having two network interfaces (e.g., the shown vNIC2 and vNIC3). The example configuration also shows a pool of two IP addresses that are associated with a subnet of the cloud provider's networking infrastructure. In this example, the IP address 172.31.51.214 and the IP address 172.31.51.215 are associated with the subnet at MAC address SM3. This is shown in the routing table. Even though there are multiple virtual machines that are accessed via the same vNIC (e.g., vNIC3 at MAC address SM3), packets are routed to the correct virtual machine. Specifically, and as shown a packet destined for VM3 is routed to VM3, whereas a packet destined for VM4 is routed to VM4. This is because there is a correspondence (e.g., in MAC address translation table $110_6$) between the cloud provider's MAC address SM3 and the cloud provider's IP address IP3 as well as a correspondence between the cloud provider's MAC address SM3 and the cloud provider's IP address IP4. Furthermore, there is a correspondence (e.g., in MAC address translation table $110_6$) between a particular VM's IP address and its virtualization system MAC address. Therefore, packets can be addressed to the correct VM using the techniques as shown and described as pertains to FIG. 4A and FIG. 4B.

FIG. 5B depicts a controller virtual machine (CVM) situated at each node. Specifically, and as shown, CVM1 is situated at Node1 and CMV2 is situated at Node2. The CVM at each node is configured to handle various forms of input and output. More specifically, a CVM can support creation and ongoing management of any number of virtualized devices. As one illustrative case, a CVM can facilitate communication with virtual disk subsystem which in turn can include direct or indirect communication using any of various IO functions (e.g., NFS IO, iSCSI IO, SMB IO, etc.). Various embodiments and uses of controller virtual machines are discussed in detail as pertains to FIG. 11A, FIG. 11B, and FIG. 11C.

Figure 6:
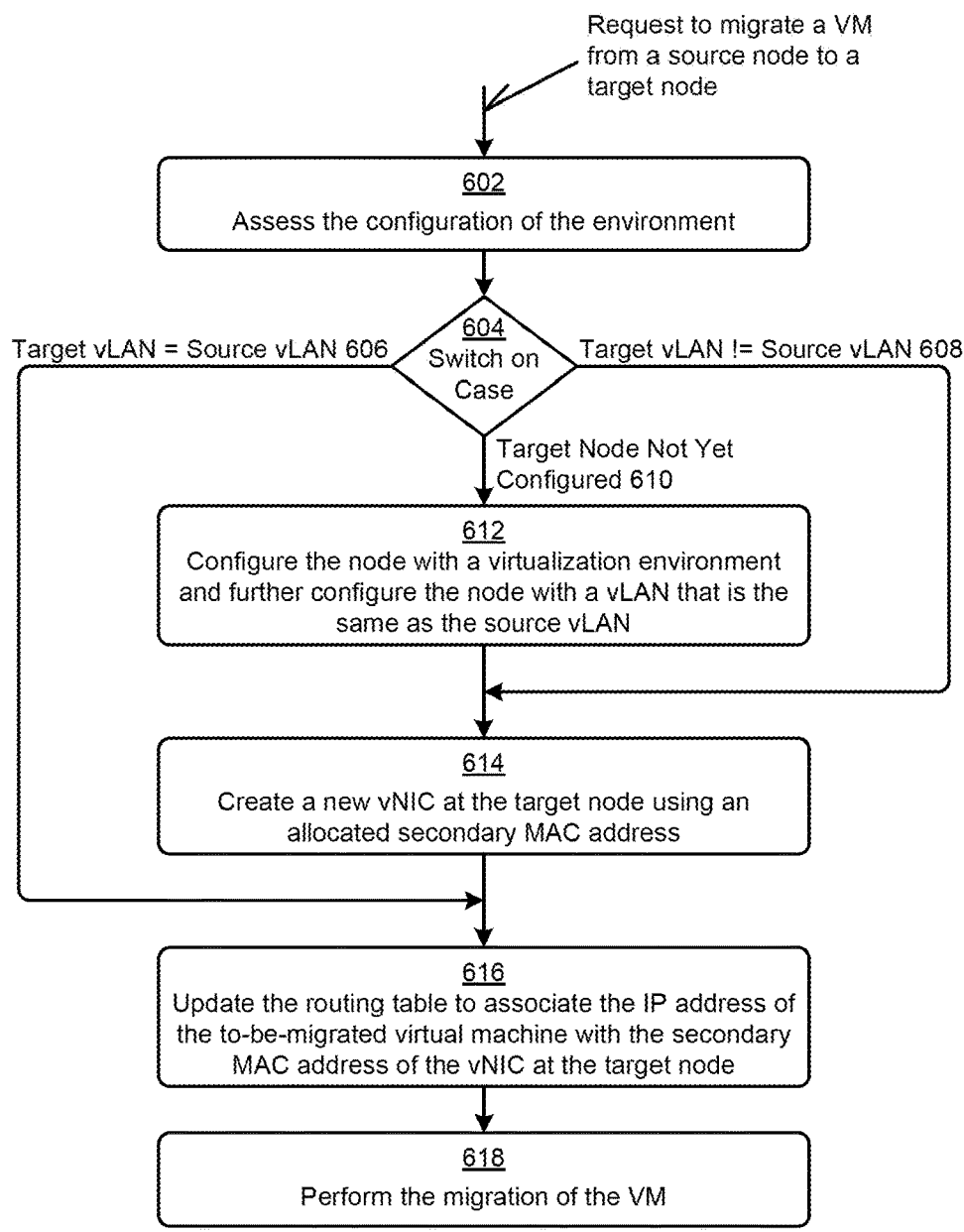
FIG. 6 depicts a virtual machine migration flow as used in systems that correlate cloud provider networking addresses to network-accessible entities in a virtualization system, according to an embodiment.

FIG. 6 depicts a virtual machine migration flow 600 as used in systems that correlate cloud provider networking addresses to network-accessible entities in a virtualization system. The shown virtual machine migration flow 600 depicts a series of steps to be undertaken before virtual machine is to be migrated. The shown flow completes when the conditions of the system are sufficient to begin VM migration. More specifically, the steps that are undertaken before virtual machine is to be migrated are steps that serve to prepare a new node with new virtual entities such that, at the time of movement of the VM from the source node to a target node, the networking infrastructure is configured to route traffic to the migrated VM.

Referring again to FIG. 5A, it can happen that a to-be-migrated VM might be on a vLAN. In such a case, it is convenient to migrate the VM to a node that has the same vLAN. However, it is possible that the target node to where the VM is to be migrated does not have the same vLAN. This case is shown in FIG. 5A. It is also possible that the target node is a "bare metal" node that does not have any components of a virtualization system. Accordingly, at step 602, the environment is assessed. In particular, the characteristics of the source node from where the VM is moved from, as well as the characteristics of the target node to where the VM is to be moved are determined. The information gathered during the assessment of step 602 is sufficient to resolve to one of three cases, as shown by decision 604.

In one case 610, the target node is a "bare metal" node that has not yet been configured with a virtualization system. In this case, processing of the flow proceeds to step 612 where the node is configured with (1) the needed virtualization system, including hypervisor, virtual switch, and at least one vNIC and (2) a vLAN that is a clone of the source vLAN (step 614). The cloned vLAN is situated to interface with the newly-created vNIC at the target node. This example is shown in the following FIG. 7A. Note that at this point, the virtual machine has not yet been migrated and that at this point the newly-created vNIC has not yet been configured.

In another case 608, the target node has a vLAN configured, but it is not the same vLAN as the vLAN at the source node. In this case, processing of the flow proceeds to step 614, where the target node is configured with a vLAN that is a clone of the source vLAN (step 614).

In yet another case 606 the target node has a vLAN configured, and it is the same vLAN as the vLAN at the source node. In this case, processing of the flow proceeds from decision 604 to step 616. Step 616 serves to update the routing table of the cloud provider's networking infrastructure so as to associate the IP address of the to-be-migrated virtual machine with the secondary MAC address of the vNIC at the target node. This example is shown in the following FIG. 7B.

After processing of step 616 completes, the virtualized environment is suitably configured to be able to carry out various migration processes (step 618). Certain migration techniques might observe a "live migration" regime where the VM keeps running during many phases of the migration, whereas other migration techniques observe a "quiesce/suspend/resume" regime where the VM's data and configuration are moved to the target node (e.g., using one or more snapshots of the VMs storage footprint), and then the VM is awakened from suspension with its data and configuration intact at the new node.

Irrespective of whether the "live migration" regime or the "quiesce/suspend/resume" regime is employed, there is a moment in time when packets are no longer to be processed at the source node, but instead, packets are to be processed at the target node. This moment in time is the trigger point for the switchover. In many embodiments, a migration manager raises the trigger point event.

Figure 7A:
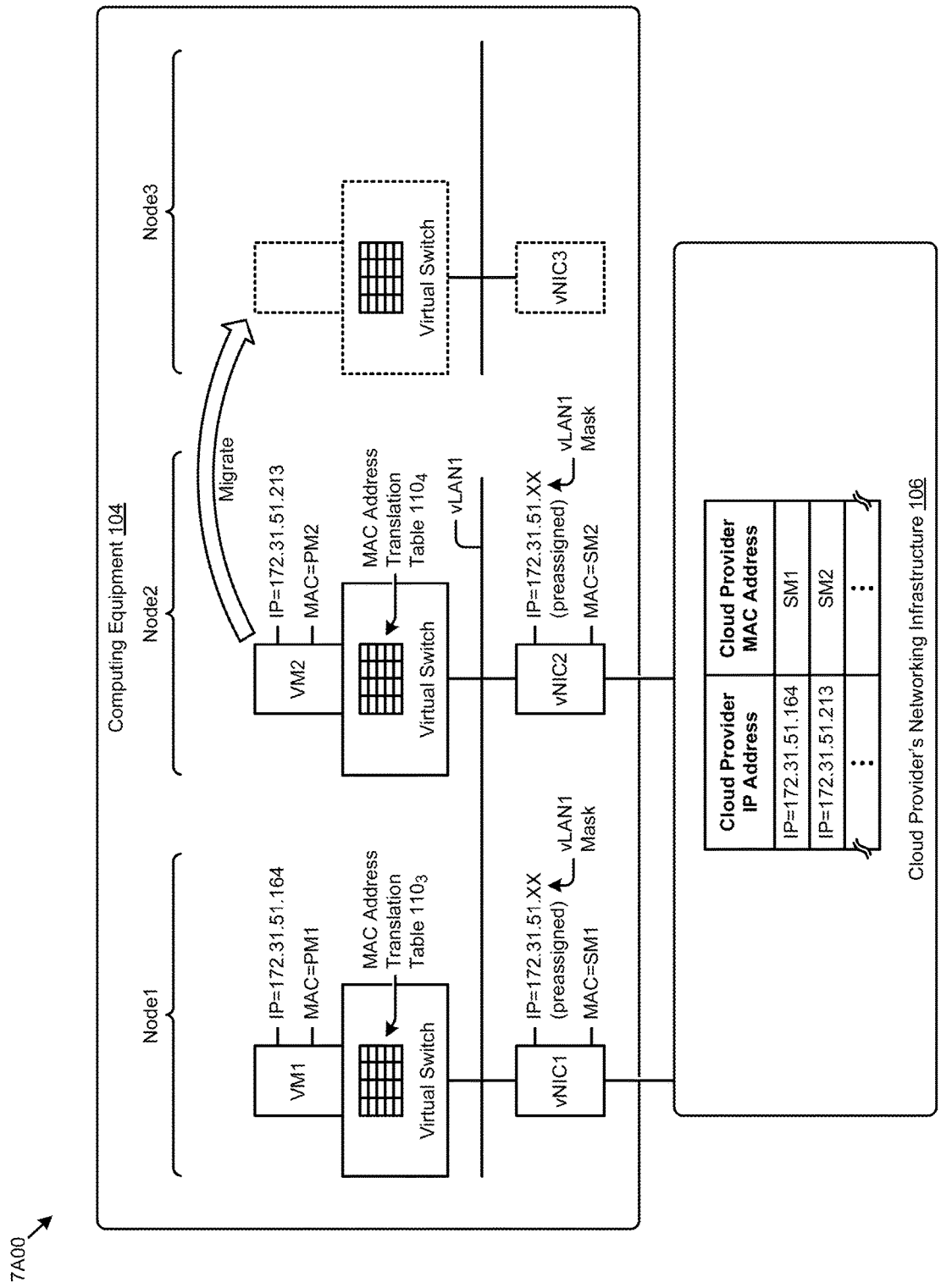
FIG. 7A depicts virtual machine migration scenario initial conditions as implemented in a virtualization system, according to an embodiment.

FIG. 7A depicts virtual machine migration scenario initial conditions 7A00 as implemented in a virtualization system. Specifically, the initial conditions 7A00 correspond to conditions where a target node has been identified, but for which node, the needed components of the virtualized system have not been loaded onto the node. In this example scenario, the to-be-migrated VM is addressed by IP address=172.31.51.213 and virtualization system MAC address PM2. Traffic to VM2 at Node2 is routed through vNIC2, and such traffic will continue to be routed through vNIC2 until such time as the routing table or tables in the cloud provider's networking infrastructure are updated to reflect the VM migration. Specifically, traffic destined for IP address=172.31.51.213 and virtualization system MAC address PM2 will continue to be routed through vNIC2 until such time as the routing table in the cloud provider's networking infrastructure is updated to reflect the cloud provider's MAC address SM3. Operations to carry out this update are depicted in FIG. 7B.

Figure 7B:
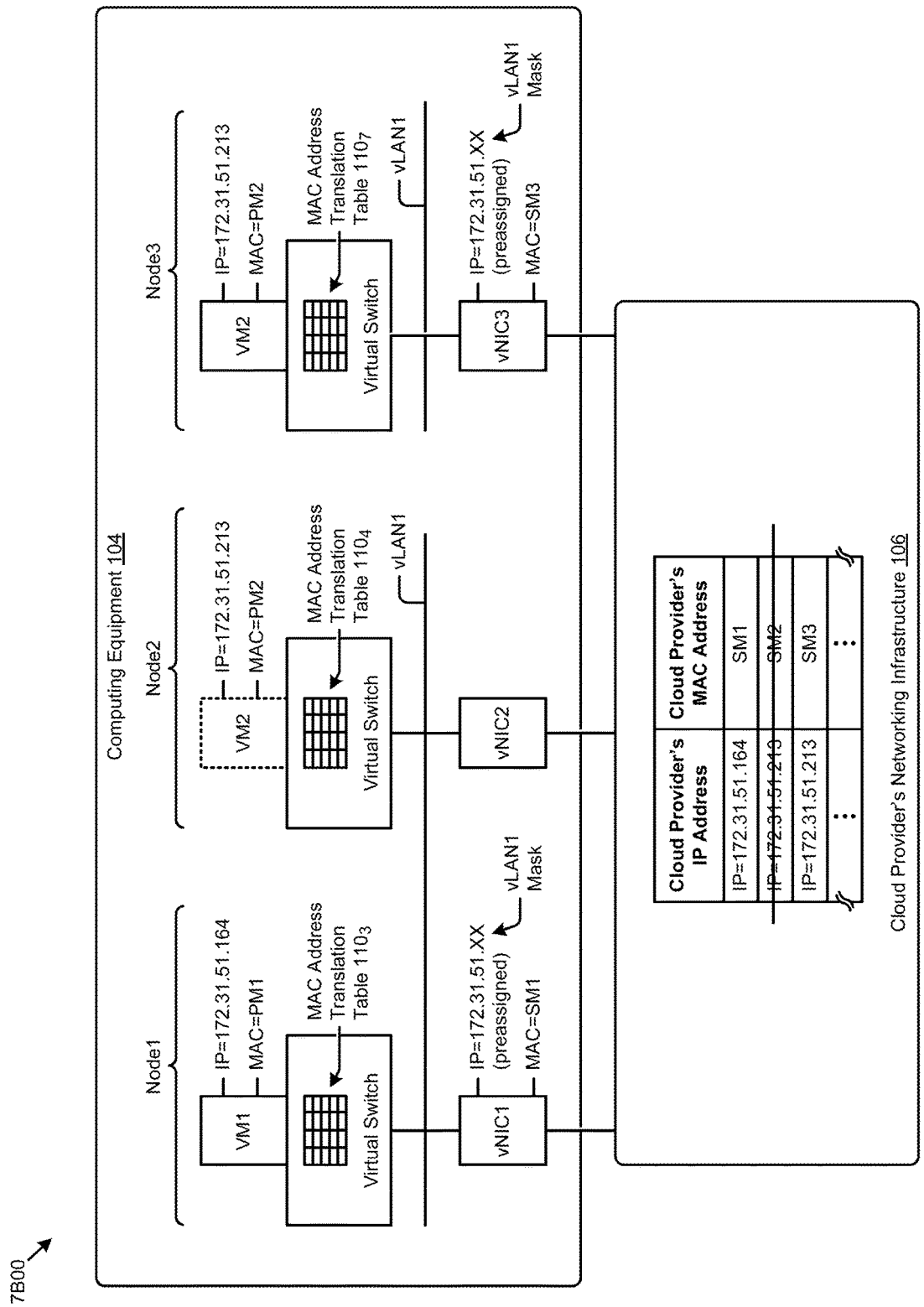
FIG. 7B depicts virtual machine migration scenario steps as implemented in a virtualization system, according to an embodiment.

FIG. 7B depicts virtual machine migration scenario steps 7B00 as implemented in a virtualization system. The figure depicts an update to a routing table within the cloud provider's networking infrastructure. The figure depicts how a change is made to a routing table so as to (1) disassociate the IP address of a to-be-migrated VM with a vNIC of a source node, and to (2) make a new association between the IP address of a to-be-migrated VM with a vNIC of a target node. Specifically, the figure depicts a table entry remove/add technique for removing an association between IP address 172.31.51.213 from the cloud provider's MAC address SM2 while contemporaneously adding a new association between IP address 172.31.51.213 and the cloud provider's MAC address SM3. Once the change takes effect through the routing tables within the cloud provider's networking infrastructure, traffic that is destined for VM2 will be routed to vNIC3 via MAC address SM3. The MAC address translation table 1107 has an entry that correlates virtual machine VM2, primary MAC address PM2, IP address 172.31.51.213 and secondary MAC address SM3.

As indicated supra, traffic destined for IP address=172.31.51.213 and virtualization system MAC address PM2 will continue to be routed through vNIC2 until such time as the routing table or tables in the cloud provider's networking infrastructure are updated to reflect the cloud provider's MAC address SM3. As such, it can happen that packets may be (erroneously) addressed to VM2 at Node2, even though VM2 is no longer situated at Node2. This means that any such errant packets need to be rerouted so as to reach VM2 at Node3.

Figure 8:
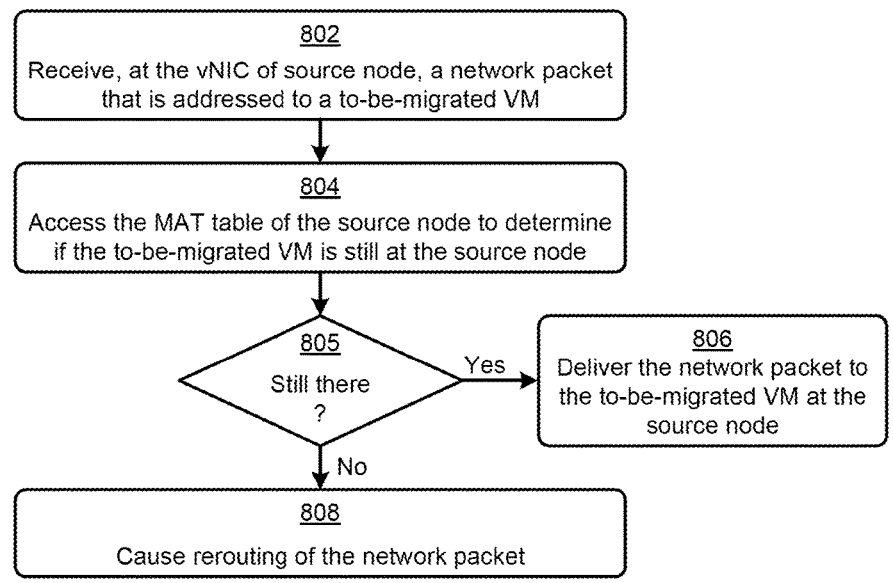
FIG. 8 depicts a network packet rerouting flow as used in systems that correlate cloud provider networking addresses to network-accessible entities in a virtualization system, according to an embodiment.

FIG. 8 depicts a network packet rerouting flow 800 as used in systems that correlate cloud provider networking addresses to network-accessible entities in a virtualization system. As earlier mentioned as pertains to FIG. 6, when migration of a to-be-migrated virtual machine is initiated, steps are taken, to update the routing table of the cloud provider's networking infrastructure so as to associate the IP address of the to-be-migrated virtual machine with the secondary MAC address of the vNIC at the target node that will receive the to-be-migrated VM. In many situations, it takes some non-zero amount of time for the routing tables of the cloud provider's networking infrastructure to be updated with secondary MAC address of the vNIC at the target node. During this non-zero amount of time, incoming packets (e.g., possibly arriving from an external system) would still be routed (erroneously) through the vNIC at the source node. As such, it can happen that a packet is received (erroneously) at the source node (step 802), where the to-be-migrated VM may—or may not—be situated.

To illustrate with an example, when migrating a VM from one node to another node, the migration is carried out by completing several migration actions: (1) the start of a VM migration is triggered at the source node, (2) a snapshot of the to-be-migrated VM is taken, and delivered to the target node, (3) a memory footprint of the to-be-migrated VM is delivered the target node, and (4) the routing table of the cloud provider's networking infrastructure is updated so as to associate the to-be-migrated VM with the vNIC of the target node. These steps take a non-zero amount of time, during which it is possible that a packet that is addressed to the to-be-migrated VM is delivered to the source node even though the VM is no longer functional at the source node (e.g., it is suspended or is undergoing some ongoing migration activities). In this and other embodiments, a migration manager triggers the start of migration.

In order to route the packet to the VM at its correct location, the virtual switch at the source node will access its MAT table to determine if the to-be-migrated VM is still functional at the source node. This determination can be made on the basis of receiving a packet addressed to a to-be-migrated VM (step 802). Then, at step 804, the MAT table is accessed to find a valid entry for the VM. If a valid entry is found, decision 805 takes the "Yes" path, and the virtual switch delivers the packet to the VM at that node (step 806). On the other hand, if the to-be-migrated VM is no longer at the source node (e.g., the migration has progressed at least that far), then the "No" path is taken, and the packet becomes subjected (at step 808) to rerouting. Disclosed hereunder are various rerouting scenarios.

Figure 9A:
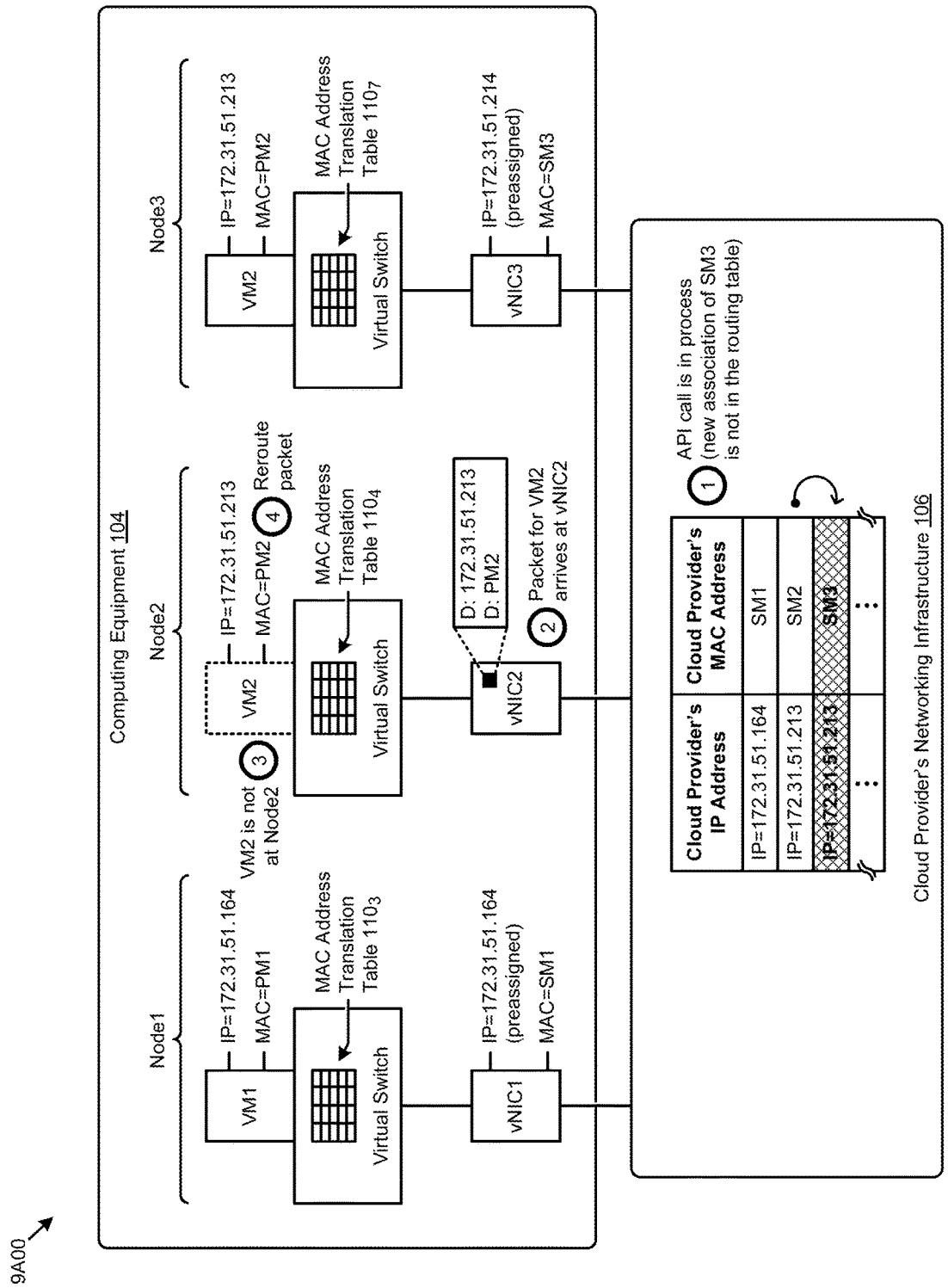
FIG. 9A depicts a network packet rerouting scenario as used in systems that correlate cloud provider networking addresses to network-accessible entities in a virtualization system, according to an embodiment.

FIG. 9A depicts a network packet rerouting scenario 9A00 as used in systems that correlate cloud provider networking addresses to network-accessible entities in a virtualization system. The scenario of FIG. 9A begins with an API call to update the routing tables of the cloud provider's networking infrastructure (operation 1). As indicated supra, this takes some non-zero time, so it is possible for a packet to be (erroneously) delivered to the former vNIC. The depiction in this scenario shows such an occurrence of a packet that is intended for VM2, but has (erroneously) arrived at vNIC2 (operation 2). The scenario further depicts making a determination that the VM corresponding to the packet is no longer at that node, and that VM2 is now at Node3 (operation 3). The scenario ends with rerouting of the packet to the vNIC of Node3 (operation 4).

There several mechanisms for a packet to be rerouted to the vNIC of Node3. In a first case, the recipient of the packet that has (erroneously) received the packet can merely drop the packet without sending an acknowledgement (ACK) back to the just previous sender. Delivery of the packet will be retried. Eventually, the routing tables of the cloud provider's networking infrastructure will be updated with the correct addresses for the migrated-to node and thus, in some future retry, the packet will be correctly addressed (i.e., to the vNIC of Node3). In another case, the packet can be forwarded to the migrated-to node using virtual forwarding that emulates layer 2 switching. In yet another case, the packet can be forwarded using a tunnel or some other out-of-band channel. In certain cases, such as when the destination virtual machine is on the same node as the node that (erroneously) receives the packet, virtual forwarding can be accomplished through use of remote procedure calls (RPC calls).

Figure 9B:
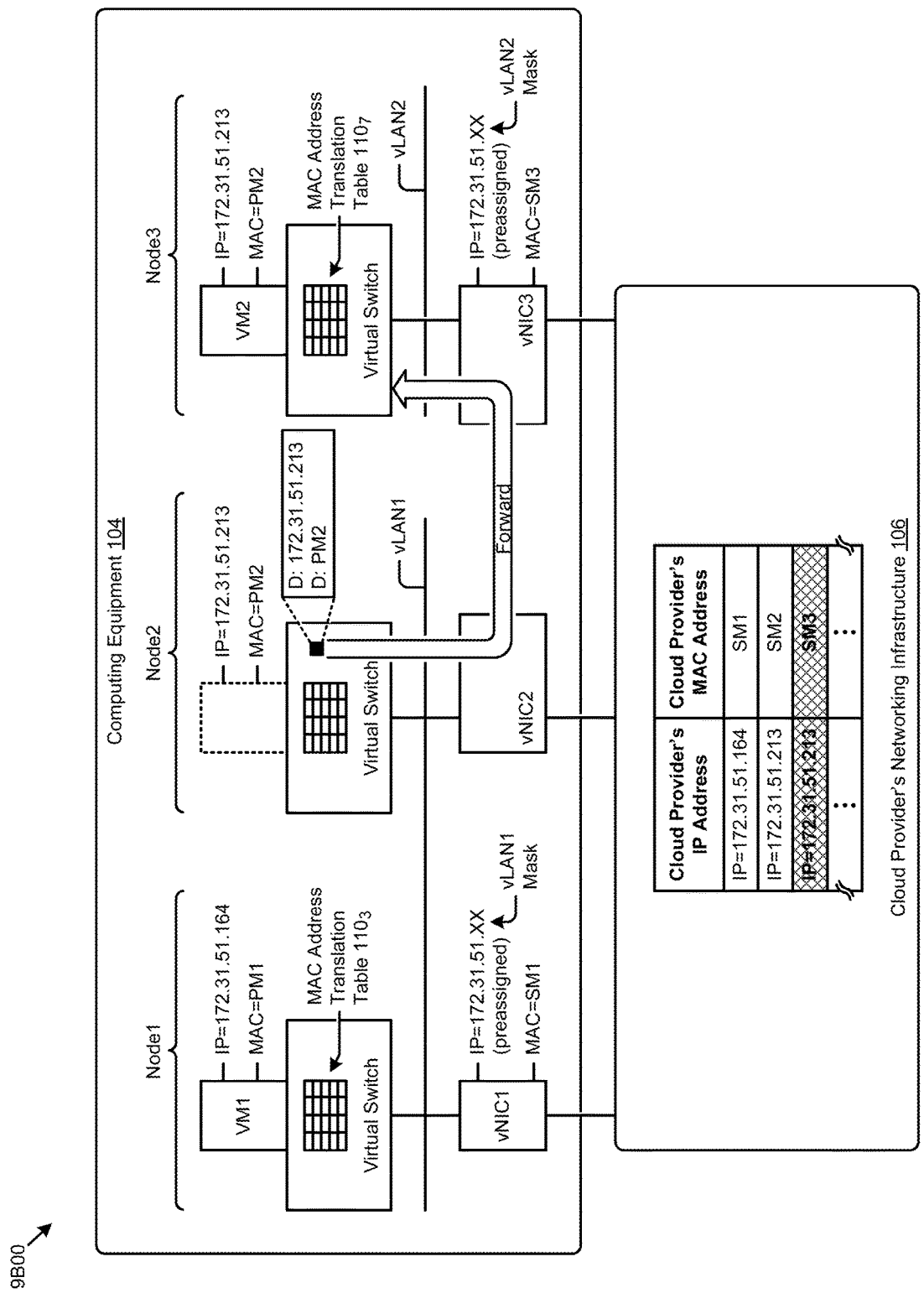
FIG. 9B depicts a network packet forwarding scenario as used in systems that correlate cloud provider networking addresses to network-accessible entities in a virtualization system, according to an embodiment.

Variations and scenarios of virtual forwarding are shown and discussed as pertains to FIG. 9B.

FIG. 9B depicts a network packet forwarding scenario 9B00 as used in systems that correlate cloud provider networking addresses to network-accessible entities in a virtualization system. As shown, when a packet destined for a virtual machine that has been migrated to the extent that it is no longer at the source node is received at the source node, the virtual switch at that node can forward the packet to an adjacent virtual switch. This is depicted by the "Forward" arrow that traverses from the virtual switch at Node2 to the virtual switch at Node3.

Handling Address Resolution on Cloud Provider Infrastructure

In some networking environments, when relying on a cloud provider's networking infrastructure such as herein described, there may be limitations placed on certain protocols. For example, a particular cloud provider's networking infrastructure may disallow or otherwise limit use of broadcast or multicast operations. Unfortunately, such limitations on broadcast operations may adversely impact the usefulness of the address resolution protocol (ARP) in determining a MAC address for given IP address. Moreover, there may be applications that rely on multicast support in a given network, and the foregoing limits on multicast operations may adversely affect operation of such applications as well. However, even if the use of broadcast/multicast operations are disallowed, unicast-based address resolution protocols operations can be used instead. One possible embodiment using unicast-based address resolution protocol operations is shown and described as pertains to FIG. 10A and FIG. 10B.

Figure 10A:
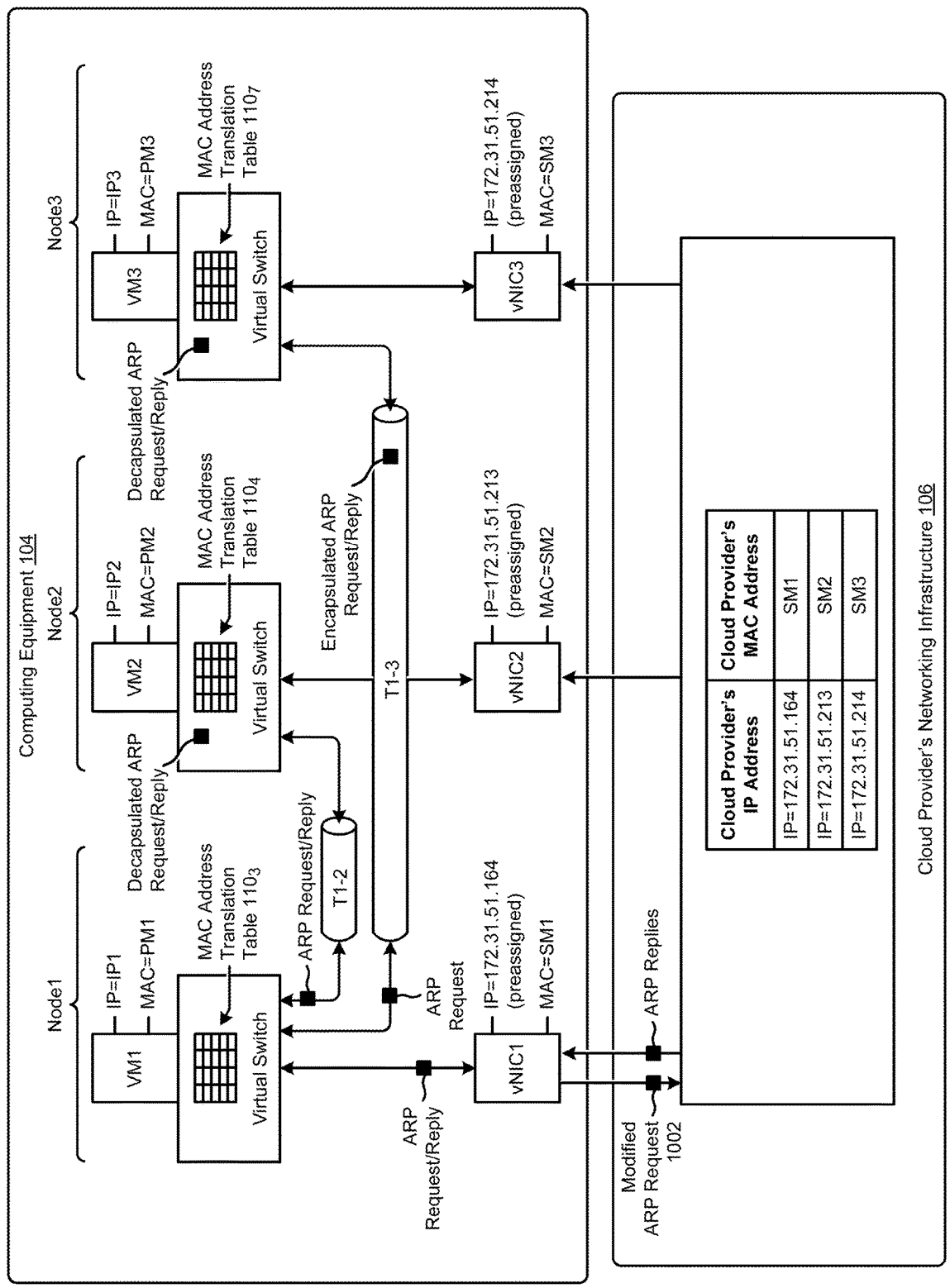
FIG. 10A and FIG. 10B depict an address association learning scenario using inter-node tunnels, according to an embodiment.

FIG. 10A depicts an address association learning scenario using inter-node tunnels. In certain environments and configurations, in particular in configurations where a virtualization system (e.g., the virtualization system installed on nodes of computing equipment 104) operates in conjunction with a cloud provider's networking infrastructure 106, the cloud provider's networking infrastructure has no knowledge of the MAC addresses that the virtualization system assigns to virtual machines. Therefore, certain network protocols that are often used for discovery and/or address resolution (e.g., address resolution protocol (ARP)) might not operate as needed. As one specific example, an unmodified ARP request that is raised by Node1 to determine the MAC address of VM2 (i.e., at IP address 172.31.51.213 on Node2) would return MAC address SM2, which is the NIC of Node2. While this is useful information, as is further discussed below, the MAC address of VM2 is still unknown. Accommodation is needed so as to facilitate address resolution to the MAC addresses of the virtual machines that had been assigned by the virtualization system.

Specifically, to accommodate the foregoing configuration and/or to accommodate use of unicast-based address resolution protocols, tunnels are created between the virtualized nodes. For illustration, representative examples are depicted as tunnel T1-2 and tunnel T1-3, where tunnel T1-2 is between Node1 and Node2, and tunnel T1-3 is between Node1 and Node3.

As an example, when an ARP request is raised by Node1, two actions are initiated: Action1 sends a modified ARP request 1002 out of vNIC1. Action2 encapsulates the ARP request into the tunnel(s) having an endpoint at vNIC1 and sends the ARP request to the far end of the tunnel(s). In Action2, an unmodified ARP request is tunneled. However, in Action1, the ARP request packet will be modified to reflect the source MAC address as being the MAC address of the sending vNIC (e.g., vNIC1 in this example). The destination MAC address of the modified ARP request need not be changed since this ARP request is a flood packet.

Returning to the operation of Action1, once the ARP request is received by virtual switches of the nodes at the far end(s) of the tunnel(s), the encapsulated ARP request is decapsulated, and the inner packet is flooded locally to all user VMs on that node. As such, as ARP requests are processed by the destination nodes (i.e., any node on the far end of a tunnel), the receiving nodes can learn the virtualization system's MAC address of the sending VM. As examples, in the case that a VM of Node1 sends an ARP request, Node2 will receive the ARP request through tunnel T1 and can learn the virtualization system's MAC address of the sending VM by inspecting the contents of the decapsulated ARP request packet. Similarly, Node3 will receive the ARP request through tunnel T3 and can learn the virtualization system's MAC address of the sending VM, again, by inspecting the contents of the decapsulated ARP request packet. In this manner a virtual switch can learn the association between the IP address of a VM and its MAC address that had been assigned by the virtualization system.

The tunnels are used in this manner to bypass the problem where, in a virtualization system as depicted, the ARP request that is flooded in Action1 will be received by a proxy at the cloud-provider's networking infrastructure. The proxy will then respond to the ARP request with an association between the IP address of the ARP request and the vNIC. This, by itself, does not help the virtual switch to learn the association between the IP address of a VM and its MAC address that had been assigned by the virtualization system. In contrast, by using the tunnels as heretofore described, the MAC address of any virtual machine as assigned by the virtualization system can be learned by any virtual switch at any virtualized node. Such learning of entries of a particular node's MAC address translation table is shown and described as pertains to FIG. 10B.

Figure 10B:
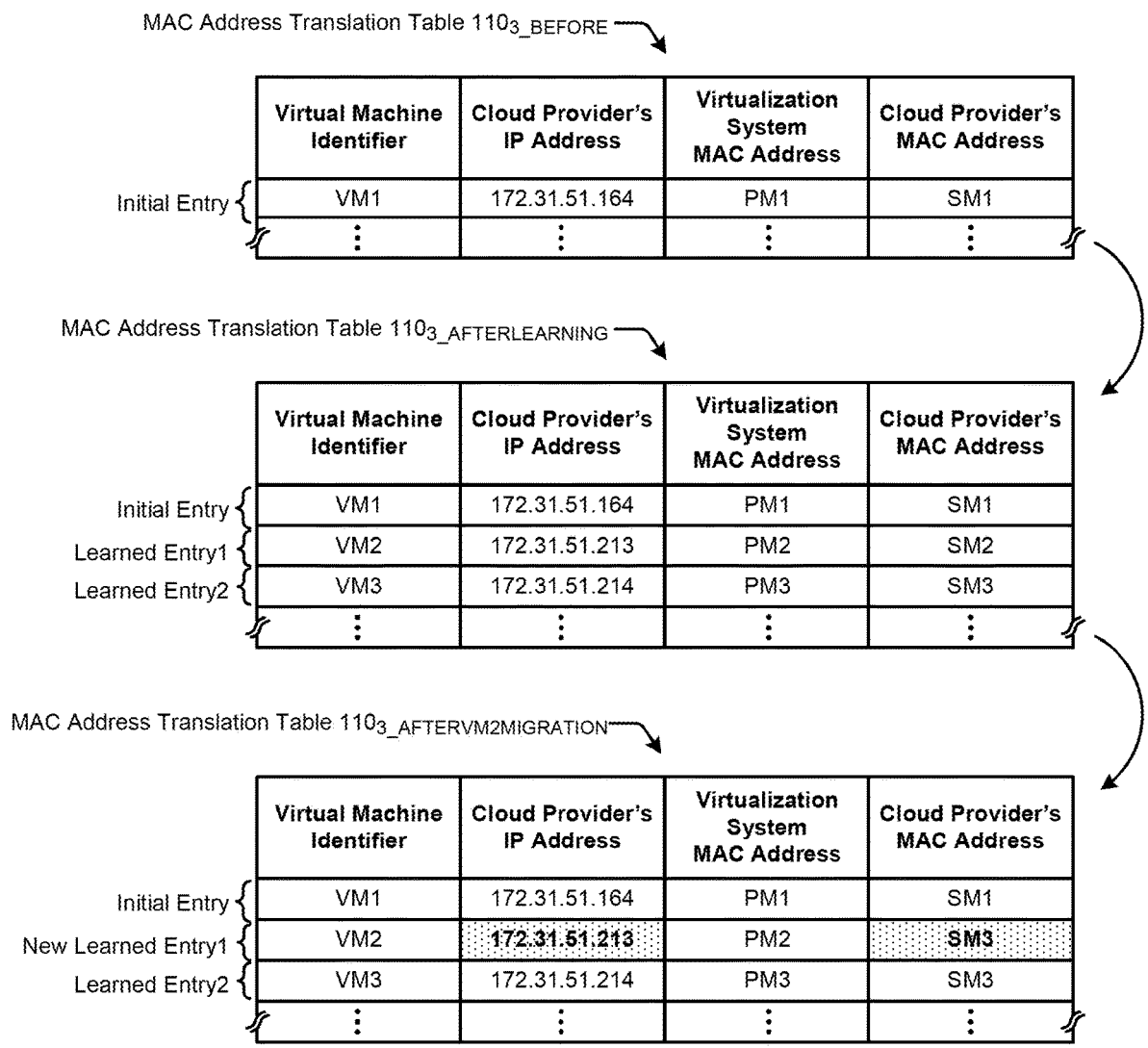

Specifically, FIG. 10B depicts a MAT table in an initial state (MAC Address Translation Table $110_{3\_BEFORE}$) as well as a MAT table after learning (MAC Address Translation Table $110_{3\_AFTERLEARNING}$). The values shown correspond to the example of FIG. 10A where Node1 raises an ARP request. Raising the ARP request invokes the heretofore-described Action1 and Action2. In operation of Action2, since the ARP request is flooded to all virtual machines of a given node, each virtual machine of that given node will respond to the ARP request with an ARP reply that includes the IP address of the responding virtual machine as well as its primary (virtualization system assigned) MAC address. More specifically, each virtual machine of a given node that responds to an ARP request will flood the ARP reply through all tunnels that are present at that node. As such, all nodes that are at an endpoint of a tunnel receive the flooded ARP replies, and as such all nodes that are at an endpoint of a tunnel can add learned entries into the node's own local MAT table.

Continuing the example of FIG. 10A, when the node that raised the ARP request receives ARP replies, it can add entries into the MAT table, which includes a correspondence between the IP address of the responding virtual machine and its primary MAC address. In the specific example shown in FIG. 10B, learned entry1 includes a correspondence between the IP address "IP2" (172.31.51.213) of virtual machine "VM2" and its primary MAC address "PM2". Continuing this example scenario, learned entry2 includes a correspondence between the IP address "IP3" (172.31.51.214) of virtual machine "VM3" and its primary MAC address "PM3".

Still continuing the example of FIG. 10A, during operation of Action1 in FIG. 10A, the modified ARP request 1002 is delivered to the cloud provider's networking infrastructure 106. As earlier described, cloud provider's networking infrastructure includes a routing table (e.g., routing table 112 as depicted in FIG. 2B). Upon consulting the routing table, the cloud provider's networking infrastructure responds to the ARP request with ARP replies, where each ARP reply includes a correspondence between a cloud provider's IP address and a cloud provider's MAC address. As such, the cloud provider's MAC address that corresponds to a cloud provider's IP address can be learned by the node that raised the ARP request. In this example, Node1 learns the correspondence between IP address 172.31.51.213 and SM2 (e.g., in learned entry1) as well as the correspondence between IP address 172.31.51.214 and SM3 (e.g., in learned entry2).

The foregoing learning can be carried out on an ongoing basis so as to continuously learn the network configuration of the virtualization system even when virtual machines are migrated. Consider, strictly as an example, a migration of virtual machine VM2 from Node2 to Node3. In this example, the IP address of VM2 is unchanged from IP2 (172.31.51.213) and the MAC address is unchanged from PM2. However, after migration, VM2 would be accessed via vNIC3. This change can be learned by operation of Action1 and Action2 as described above. Specifically, and as shown in the MAT table after learning (e.g., the shown MAC Address Translation Table 110$_{3\_AFTERVM2MIGRATION}$) there is a new learned entry1 for VM2. As shown, VM2, which before, during and after migration is at IP address 172.31.51.213, is now associated with vNIC3 at IP address 172.31.51.214 and MAC address SM3. In this migration example, the migrated virtual machine VM2 retains it IP address and its MAC address as assigned by the virtualization system.

The foregoing entries, including any learned entries—whether or not pertaining to a migrated virtual machine—can be maintained by the virtual switch at each node. The particular layout of such entries can be tabularized such as is depicted in the foregoing, or the particular layout of such entries can be organized in a hierarchy. In some cases, storage of such entries can be held in node-local memory, possibly in node-local cache memory, and/or in random access memory and/or in content addressable memory.

Maintaining Existence of Tunnels

In example embodiments, all virtual switches of all virtualized nodes maintain a data structure that includes existence of all tunnels between themselves and all other nodes that are members of the same virtual cluster. As such, any outgoing ARP request raised by any VM of any virtualized node of the cluster can be encapsulated and sent through all tunnels to all of the other virtualized nodes of the cluster. Such tunnels can be added to the data structures of the virtual switches whenever a new node is added to a cluster. The newly-added tunnels remain in the data structures so long as there is both a near-end node and a far-end node of the tunnel. Tunnels are removed from the data structures of the virtual switches whenever a new node is removed from a cluster.

As can be understood, the tunnels of FIG. 10A can be used for purposes other than for handling merely the foregoing ARP requests. For example, the forwarding operations as described in FIG. 9B can be carried out using the tunnels. Specifically, when forwarding a packet from a first node to a second node (e.g., because of a migration of a VM), the packets to be forwarded can be encapsulated and sent to the destination node through a corresponding tunnel.

System Architecture Overview

Additional System Architecture Examples

Figure 11A:
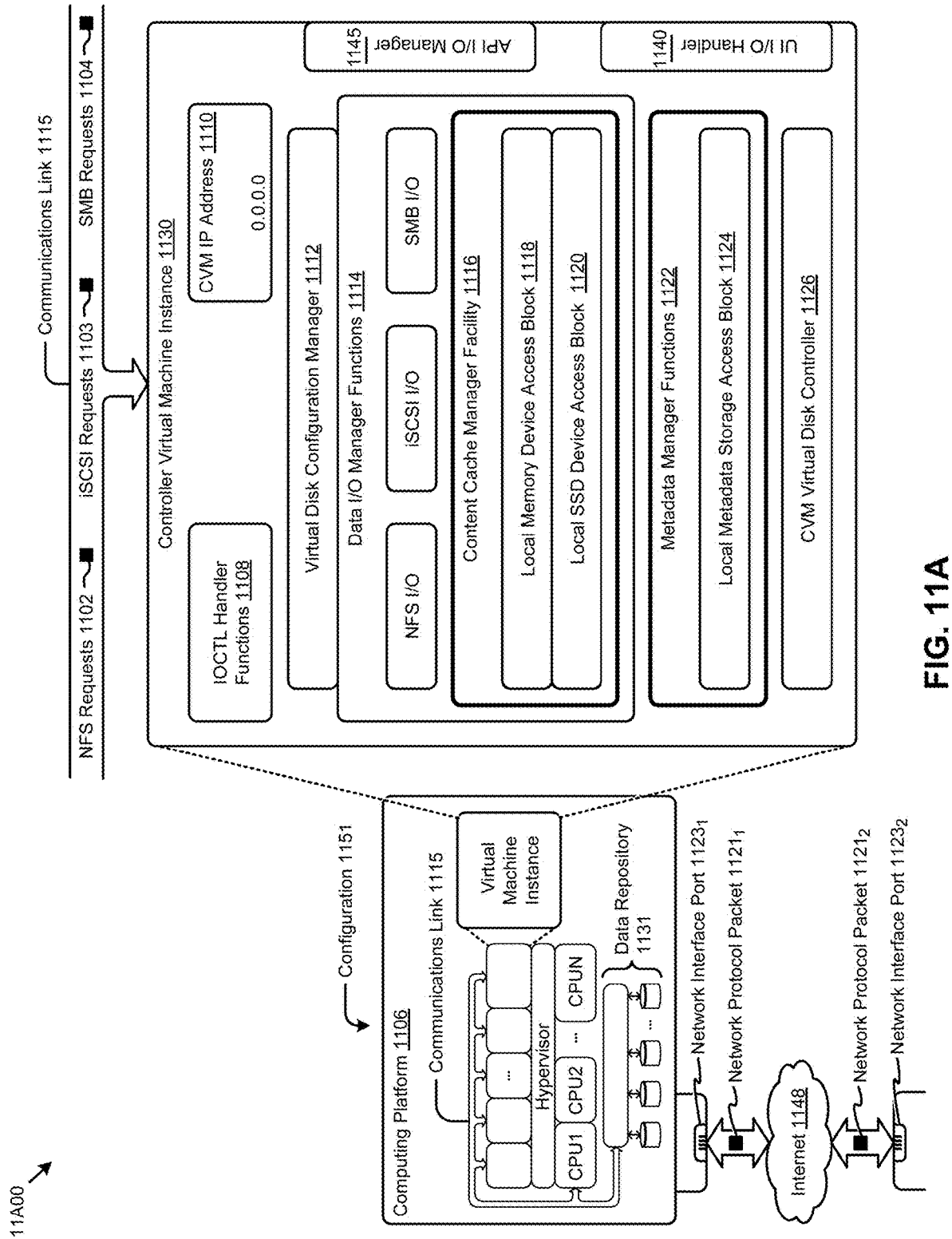
FIG. 11A, FIG. 11B, and FIG. 11C depict virtualized controller architectures comprising collections of interconnected components suitable for implementing embodiments of the present disclosure and/or for use in the herein-described environments.

FIG. 11A depicts a controller virtual machine as implemented in the shown virtual machine architecture 11A00. The heretofore-disclosed embodiments, including variations of any virtualized systems using any variations of virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 11A00 comprises a collection of interconnected components suitable for implementing embodiments of the present disclosure and/or for use in the herein-described environments. Moreover, virtual machine architecture 11A00 includes a virtual machine instance in configuration 1151 that is further described as pertaining to controller virtual machine instance 1130. Configuration 1151 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 1130.

In this and other configurations, a controller virtual machine instance receives block I/O storage requests as network file system (NFS) requests in the form of NFS requests 1102, and/or internet small computer storage interface (iSCSI) block IO requests in the form of iSCSI requests 1103, and/or Samba file system (SMB) requests in the form of SMB requests 1104. The controller virtual machine (CVM) instance publishes and responds to an internet protocol (IP) address (e.g., CVM IP address 1110). Various forms of input and output can be handled by one or more IO control handler functions (e.g., IOCTL handler functions 1108) that interface to other functions such as data IO manager functions 1114 and/or metadata manager functions 1122. As shown, the data IO manager functions can include communication with virtual disk configuration manager 1112 and/or can include direct or indirect communication with any of various block IO functions (e.g., NFS IO, iSCSI IO, SMB IO, etc.).

In addition to block IO functions, configuration 1151 supports IO of any form (e.g., block IO, streaming IO, packet-based IO, HTTP traffic, etc.) through either or both of a user interface (UI) handler such as UI IO handler 1140 and/or through any of a range of application programming interfaces (APIs), possibly through API IO manager 1145.

Communications link 1115 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 1130 includes content cache manager facility 1116 that accesses storage locations, possibly including local dynamic random access memory (DRAM) (e.g., through local memory device access block 1118) and/or possibly including accesses to local solid state storage (e.g., through local SSD device access block 1120).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 1131, which in turn can be formatted into any one or more storage areas, and which can comprise parameterized storage accessible by a key (e.g., a filename, a table name, a block address, an offset address, etc.). Data repository 1131 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 1124. The data repository 1131 can be configured using CVM virtual disk controller 1126, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, CPUN). According to certain embodiments of the disclosure, two or more instances of configuration 1151 can be coupled by communications link 1115 (e.g., backplane, LAN, PSTN, wired or wireless network, etc.) and each instance may perform respective portions of sequences of instructions as may be required to practice embodiments of the disclosure.

The shown computing platform 1106 is interconnected to the Internet 1148 through one or more network interface ports (e.g., network interface port $1123_1$ and network interface port $1123_2$). Configuration 1151 can be addressed through one or more network interface ports using an IP address. Any operational element within computing platform 1106 can perform sending and receiving operations using any of a range of network protocols, possibly including network protocols that send and receive packets (e.g., network protocol packet $1121_1$ and network protocol packet $1121_2$).

Computing platform 1106 may transmit and receive messages that can be composed of configuration data and/or any other forms of data and/or instructions organized into a data structure (e.g., communications packets). In some cases, the data structure includes program instructions (e.g., application code) communicated through the Internet 1148 and/or through any one or more instances of communications link 1115. Received program instructions may be processed and/or executed by a CPU as it is received and/or program instructions may be stored in any volatile or non-volatile storage for later execution. Program instructions can be transmitted via an upload (e.g., an upload from an access device over the Internet 1148 to computing platform 1106). Further, program instructions and/or the results of executing program instructions can be delivered to a particular user via a download (e.g., a download from computing platform 1106 over the Internet 1148 to an access device).

Configuration 1151 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (vLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to correlation of cloud provider networking addresses to network-accessible entities in a virtualization system. In some embodiments, a module may include one or more state machines and/or combinational logic used to implement or facilitate the operational and/or performance characteristics pertaining to correlation of cloud provider networking addresses to network-accessible entities in a virtualization system.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of correlation of cloud provider networking addresses to network-accessible entities in a virtualization system). Such files or records can be brought into and/or stored in volatile or non-volatile memory. More specifically, the occurrence and organization of the foregoing files, records, and data structures improve the way that the computer stores and retrieves data in memory, for example, to improve the way data is stored and accessed when the computer is performing operations pertaining to correlation of cloud provider networking addresses to network-accessible entities in a virtualization system, and/or for improving the way data is manipulated when performing computerized operations pertaining to maintaining cloud provider networking addresses that correlate to virtual machine networking addresses in a virtualization system.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 11B:
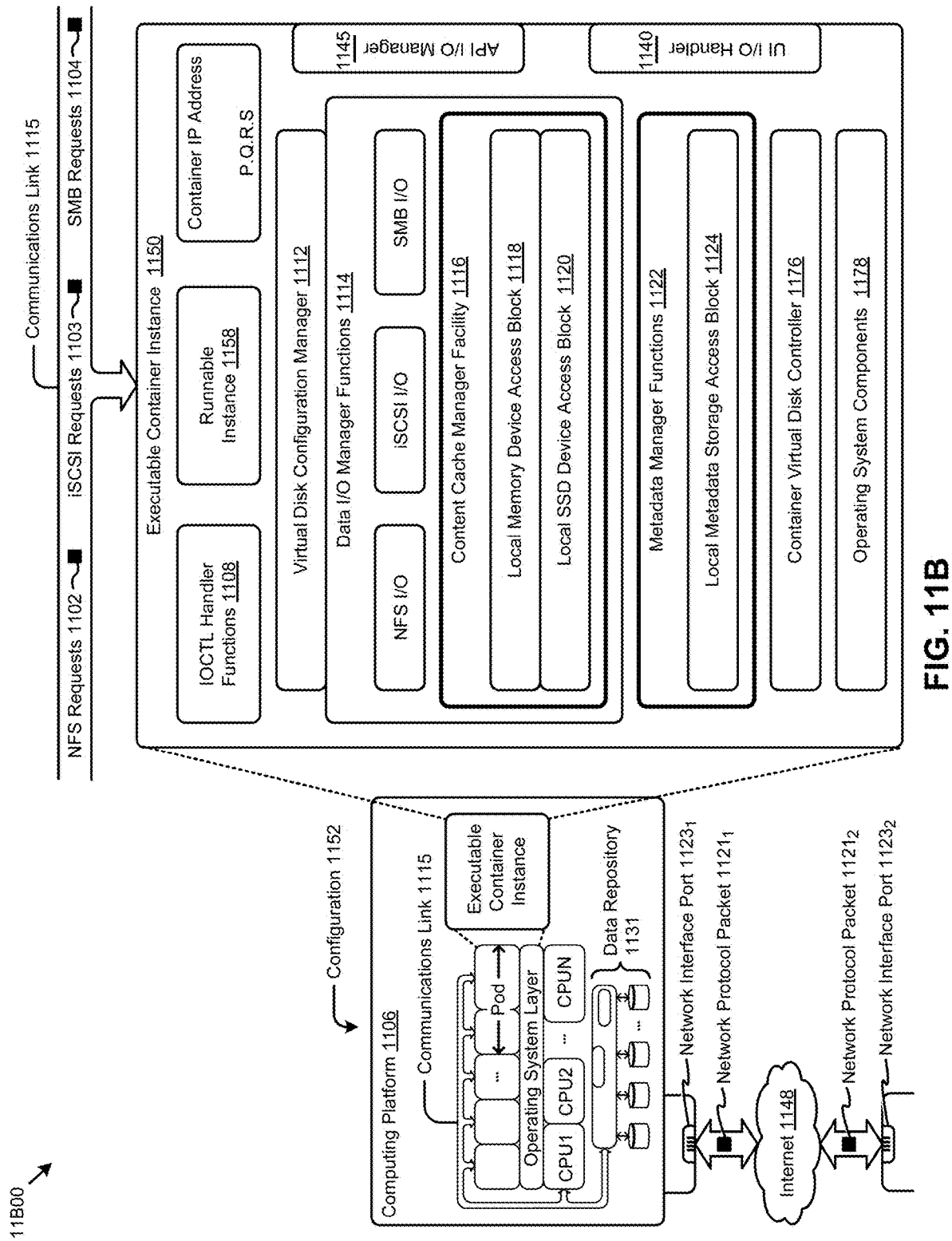

FIG. 11B depicts a virtualized controller implemented by containerized architecture 11B00. The containerized architecture comprises a collection of interconnected components suitable for implementing embodiments of the present disclosure and/or for use in the herein-described environments. Moreover, the shown containerized architecture 11B00 includes an executable container instance in configuration 1152 that is further described as pertaining to executable container instance 1150. Configuration 1152 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 1150). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls-a", etc.). The executable container might optionally include operating system components 1178, however such a separate set of operating system components need not be provided. As an alternative, an executable container can include runnable instance 1158, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 1176. Such a container virtual disk controller can perform any of the functions that the aforementioned CVM virtual disk controller 1126 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 11C:
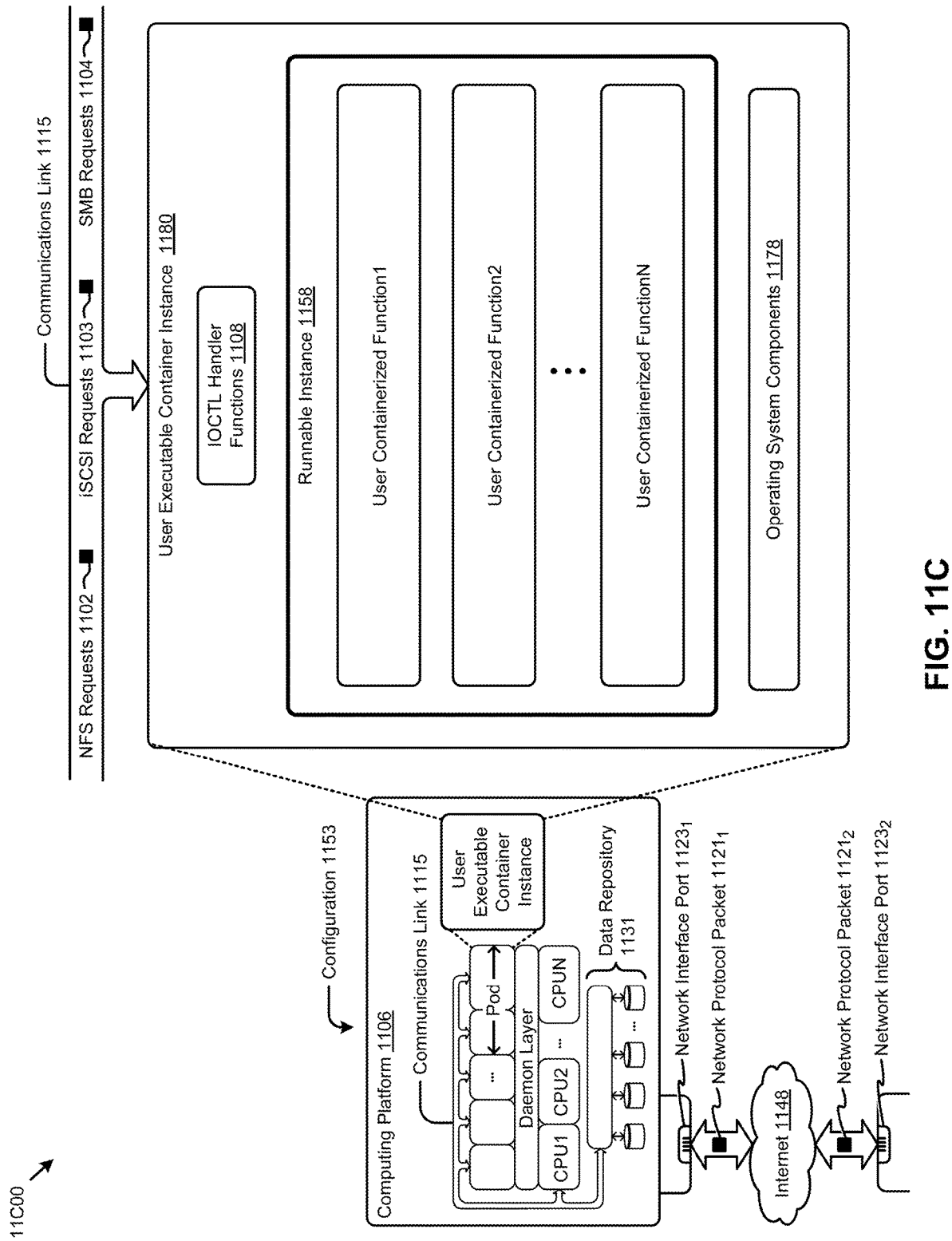

FIG. 11C depicts a virtualized controller implemented by a daemon-assisted containerized architecture 11C00. The containerized architecture comprises a collection of interconnected components suitable for implementing embodiments of the present disclosure and/or for use in the herein-described environments. Moreover, the shown daemon-assisted containerized architecture includes a user executable container instance in configuration 1153 that is further described as pertaining to user executable container instance 1180. Configuration 1153 includes a daemon layer (as shown) that performs certain functions of an operating system.

User executable container instance 1180 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 1158). In some cases, the shown operating system components 1178 comprise portions of an operating system, which portions are interfaced with or included in the runnable instance and/or any user containerized functions. In this embodiment of a daemon-assisted containerized architecture, the computing platform 1106 might or might not host operating system components other than operating system components 1178. More specifically, the shown daemon might or might not host operating system components other than operating system components 1178 of user executable container instance 1180.

The virtual machine architecture 11A00 of FIG. 11A and/or the containerized architecture 11B00 of FIG. 11B and/or the daemon-assisted containerized architecture 11C00 of FIG. 11C can be used in any combination to implement a distributed platform that contains multiple servers and/or nodes that manage multiple tiers of storage where the tiers of storage might be formed using the shown data repository 1131 and/or any forms of network accessible storage. As such, the multiple tiers of storage may include storage that is accessible over communications link 1115. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 1151 of FIG. 11A) to manage the interactions between the underlying hardware and user virtual machines or containers that run client software.

Distinct from user virtual machines or user executable containers, a special controller virtual machine (e.g., as depicted by controller virtual machine instance 1130) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when executed by a processor cause acts comprising:
    providing, by a tenant or by a third party on behalf of the tenant, a tenant virtualization system deployed on a bare metal infrastructure, the bare metal infrastructure provided by a cloud provider and comprising a plurality of bare metal computing nodes interconnected over a cloud provider communications network of the cloud provider, wherein the plurality of bare metal computing nodes are addressable by respective cloud provider media access control (MAC) addresses provided by the cloud provider;
    receiving, by the tenant virtualization system, the cloud provider MAC addresses from the cloud provider, wherein individual cloud provider MAC addresses correspond to individual hardware network interfaces of the bare metal computing nodes;
    generating, by the tenant virtualization system, tenant virtualization system MAC addresses, wherein individual tenant virtualization system MAC addresses correspond to individual virtual machines provided by the tenant, or by a third party on behalf of the tenant, on the bare metal computing nodes;
    maintaining, on multiple bare metal nodes corresponding to the tenant virtualization system, respective MAC translation tables having at least a subset of the cloud provider MAC addresses received from the cloud provider and at least a subset of the tenant virtualization system MAC addresses generated by the tenant virtualization system, wherein at least one cloud provider MAC address of a bare metal computing node is mapped to multiple tenant virtualization system MAC addresses that each correspond to a respective virtual machine of the individual virtual machines on the bare metal computing node;
    routing a packet to an individual virtual machine on an individual bare metal computing node of the plurality of bare metal computing nodes corresponding to the tenant virtualization system at least by:
        sending the packet from a sender bare metal computing node, wherein the packet is outgoing from a sender virtual machine; and
        modifying the packet by changing a sender tenant virtualization system MAC address corresponding to the sender virtual machine to a sender cloud provider MAC address corresponding to a sender hardware network interface of the sender bare metal computing node based at least on an entry having the sender tenant virtualization system MAC address in a sender MAC translation table;
        receiving the packet at the individual bare metal computing node, wherein the packet is addressed to the individual bare metal computing node of the tenant virtualization system using an individual cloud provider MAC address; and
        modifying the packet by changing the individual cloud provider MAC address to an individual tenant virtualization system MAC address based at least on an entry having the individual tenant virtualization system MAC address in an individual MAC translation table.

2. The non-transitory computer readable medium of claim 1, wherein the acts further comprise creating a virtual network interface card (vNIC) at a target node and assigning a cloud provider media access control address to the vNIC.

3. The non-transitory computer readable medium of claim 2, wherein the acts further comprise updating the MAC translation table to associate an IP address of a virtual machine to be migrated with a MAC address of the vNIC.

4. The non-transitory computer readable medium of claim 2, wherein the acts further comprise updating a routing table of the cloud provider to associate a to-be-migrated virtual machine (VM) with the vNIC of the target node.

5. The non-transitory computer readable medium of claim 1, wherein the acts further comprise updating a routing table of the cloud provider to disassociate an IP address of a to-be-migrated virtual machine (VM) with the sender hardware network interface of the sender bare metal computing node.

6. The non-transitory computer readable medium of claim 1, wherein the acts further comprise determining if a to-be-migrated virtual machine (VM) is still operational at the individual bare metal computing node to receive an incoming packet.

7. The non-transitory computer readable medium of claim 1, wherein the acts further comprise configuring an encapsulation tunnel between the individual bare metal computing node and a sender bare metal computing node.

8. The non-transitory computer readable medium of claim 7, wherein the acts further comprise sending an address resolution protocol (ARP) request to the sender bare metal computing node over the encapsulation tunnel.

9. A method comprising:
providing, by a tenant or by a third party on behalf of the tenant, a tenant virtualization system deployed on a bare metal infrastructure, the bare metal infrastructure provided by a cloud provider and comprising a plurality of bare metal computing nodes interconnected over a cloud provider communications network of the cloud provider, wherein the plurality of bare metal computing nodes are addressable by respective cloud provider media access control (MAC) addresses provided by the cloud provider;
receiving, by the tenant virtualization system, the cloud provider MAC addresses from the cloud provider, wherein individual cloud provider MAC addresses correspond to individual hardware network interfaces of the bare metal computing nodes;
generating, by the tenant virtualization system, tenant virtualization system MAC addresses, wherein individual tenant virtualization system MAC addresses correspond to individual virtual machines provided by the tenant, or by a third party on behalf of the tenant, on the bare metal computing nodes;
maintaining, on multiple bare metal nodes corresponding to the tenant virtualization system, respective MAC translation tables having at least a subset of the cloud provider MAC addresses received from the cloud provider and at least a subset of the tenant virtualization system MAC addresses generated by the tenant virtualization system, wherein at least one cloud provider MAC address of a bare metal computing node is mapped to multiple tenant virtualization system MAC addresses that each correspond to a respective virtual machine of the individual virtual machines on the bare metal computing node;
routing a packet to an individual virtual machine on an individual bare metal computing node of the plurality of bare metal computing nodes corresponding to the tenant virtualization system at least by:
sending the packet from a sender bare metal computing node, wherein the packet is outgoing from a sender virtual machine; and
modifying the packet by changing a sender tenant virtualization system MAC address corresponding to the sender virtual machine to a sender cloud provider MAC address corresponding to a sender hardware network interface of the sender bare metal computing node based at least on an entry having the sender tenant virtualization system MAC address in a sender MAC translation table;
receiving the packet at the individual bare metal computing node, wherein the packet is addressed to the individual bare metal computing node of the tenant virtualization system using an individual cloud provider MAC address; and
modifying the packet by changing the individual cloud provider MAC address to an individual tenant virtualization system MAC address based at least on an entry having the individual tenant virtualization system MAC address in an individual MAC translation table.

10. The method of claim 9, further comprising creating a virtual network interface card (vNIC) at a target node and assigning a cloud provider media access control address to the vNIC.

11. The method of claim 10, further comprising updating the MAC translation table to associate an IP address of a virtual machine to be migrated with a MAC address of the vNIC.

12. The method of claim 10, further comprising updating a routing table of the cloud provider to associate a to-be-migrated virtual machine (VM) with the vNIC of the target node.

13. The method of claim 9, further comprising updating a routing table of the cloud provider to disassociate an IP address of a to-be-migrated virtual machine (VM) with the sender hardware network interface of the sender bare metal computing node.

14. The method of claim 9, further comprising determining if a to-be-migrated virtual machine (VM) is still operational at the individual bare metal computing node to receive an incoming packet.

15. The method of claim 9, further comprising configuring an encapsulation tunnel between the individual bare metal computing node and a sender bare metal computing node.

16. The method of claim 15, further comprising sending an address resolution protocol (ARP) request to the sender bare metal computing node over the encapsulation tunnel.

17. A system comprising:
a storage medium having stored thereon a sequence of instructions; and
a processor that executes the sequence of instructions to cause acts comprising,
providing, by a tenant or by a third party on behalf of the tenant, a tenant virtualization system deployed on a bare metal infrastructure, the bare metal infrastructure provided by a cloud provider and comprising a plurality of bare metal computing nodes interconnected over a cloud provider communications network of the cloud provider, wherein the plurality of bare metal computing nodes are addressable by respective cloud provider media access control (MAC) addresses provided by the cloud provider;

receiving, by the tenant virtualization system, the cloud provider MAC addresses from the cloud provider, wherein individual cloud provider MAC addresses correspond to individual hardware network interfaces of the bare metal computing nodes;

generating, by the tenant virtualization system, tenant virtualization system MAC addresses, wherein individual tenant virtualization system MAC addresses correspond to individual virtual machines provided by the tenant, or by a third party on behalf of the tenant, on the bare metal computing nodes;

maintaining, on multiple bare metal nodes corresponding to the tenant virtualization system, respective MAC translation tables having at least a subset of the cloud provider MAC addresses received from the cloud provider and at least a subset of the tenant virtualization system MAC addresses generated by the tenant virtualization system, wherein at least one cloud provider MAC address of a bare metal computing node is mapped to multiple tenant virtualization system MAC addresses that each correspond to a respective virtual machine of the individual virtual machines on the bare metal computing node;

routing a packet to an individual virtual machine on an individual bare metal computing node of the plurality of bare metal computing nodes corresponding to the tenant virtualization system at least by:

sending the packet from a sender bare metal computing node, wherein the packet is outgoing from a sender virtual machine; and modifying the packet by changing a sender tenant virtualization system MAC address corresponding to the sender virtual machine to a sender cloud provider MAC address corresponding to a sender hardware network interface of the sender bare metal computing node based at least on an entry having the sender tenant virtualization system MAC address in a sender MAC translation table;

receiving the packet at the individual bare metal computing node, wherein the packet is addressed to the individual bare metal computing node of the tenant virtualization system using an individual cloud provider MAC address; and modifying the packet by changing the individual cloud provider MAC address to an individual tenant virtualization system MAC address based at least on an entry having the individual tenant virtualization system MAC address in an individual MAC translation table.

18. The system of claim 17, wherein the acts further comprise creating a virtual network interface card (vNIC) at a target node and assigning a cloud provider media access control address to the vNIC.

19. The system of claim 18, wherein the acts further comprise updating the MAC translation table to associate an IP address of a virtual machine to be migrated with a MAC address of the vNIC.

20. The system of claim 18, wherein the acts further comprise updating a routing table of the cloud provider to associate a to-be-migrated virtual machine (VM) with the vNIC of the target node.

21. The system of claim 17, wherein the acts further comprise updating a routing table of the cloud provider to disassociate an IP address of a to-be-migrated virtual machine (VM) with the sender hardware network interface of the sender bare metal computing node.

22. The system of claim 17, wherein the acts further comprise determining if a to-be-migrated virtual machine (VM) is still operational at the individual bare metal computing node to receive an incoming packet.

23. The system of claim 17, wherein the acts further comprise configuring an encapsulation tunnel between the individual bare metal computing node and a sender bare metal computing node.

24. The system of claim 23, wherein the acts further comprise sending an address resolution protocol (ARP) request to the sender bare metal computing node over the encapsulation tunnel.

\* \* \* \* \*